United States Patent
Cheatham, III et al.

(10) Patent No.: US 9,739,883 B2
(45) Date of Patent: Aug. 22, 2017

(54) SYSTEMS AND METHODS FOR ULTRASONIC VELOCITY AND ACCELERATION DETECTION

(71) Applicant: Elwha LLC, Bellevue, WA (US)

(72) Inventors: Jesse R. Cheatham, III, Seattle, WA (US); Roderick A. Hyde, Redmond, WA (US); Muriel Y. Ishikawa, Livermore, CA (US); Jordin T. Kare, Seattle, WA (US); Craig J. Mundie, Seattle, WA (US); Nathan P. Myhrvold, Bellevue, WA (US); Robert C. Petroski, Seattle, WA (US); Eric D. Rudder, Mercer Island, WA (US); Desney S. Tan, Kirkland, WA (US); Clarence T. Tegreene, Mercer Island, WA (US); Charles Whitmer, North Bend, WA (US); Andrew Wilson, Seattle, WA (US); Jeannette M. Wing, Bellevue, WA (US); Lowell L. Wood, Jr., Bellevue, WA (US); Victoria Y. H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 577 days.

(21) Appl. No.: 14/280,463

(22) Filed: May 16, 2014

(65) Prior Publication Data

US 2015/0331102 A1    Nov. 19, 2015

(51) Int. Cl.
G01S 15/58    (2006.01)
G01S 15/06    (2006.01)
(Continued)

(52) U.S. Cl.
CPC .......... *G01S 15/58* (2013.01); *G01S 7/52003* (2013.01); *G01S 15/003* (2013.01); *G01S 15/025* (2013.01);
(Continued)

(58) Field of Classification Search
CPC .. G01S 15/06; G01S 15/8904; G01S 15/8993; G01S 15/04; G01S 15/88
(Continued)

(56) References Cited

U.S. PATENT DOCUMENTS 4,114,146 A    9/1978  Inoue et al.
5,686,942 A    11/1997 Ball
(Continued)

OTHER PUBLICATIONS

PCT International Search Report; International App. No. PCT/US2015/019614; May 19, 2015; pp. 1-3.
(Continued)

*Primary Examiner* — Carol S Tsai

(57) ABSTRACT

The present disclosure provides systems and methods associated with determining velocity and/or acceleration information using ultrasound. A system may include one or more ultrasonic transmitters and/or receivers. An ultrasonic transmitter may be configured to transmit ultrasound into a region bounded by one or more surfaces. The ultrasonic receiver may detect a Doppler shift of reflected ultrasound to determine an acceleration and/or velocity associated with an object. The velocity and/or acceleration information may be utilized to modify the state of a gaming system, entertainment system, infotainment system, and/or other device. The velocity and/or acceleration date may be used in combination with a mapping or positioning system that generates positional data associated with the objects.

13 Claims, 19 Drawing Sheets

(51) Int. Cl.

| | | |
|---|---|---|
| *G01S 15/02* | (2006.01) | |
| *G01S 7/52* | (2006.01) | |
| *G01S 15/00* | (2006.01) | |
| *G01S 15/46* | (2006.01) | |
| *G01S 15/74* | (2006.01) | |
| *G01S 15/87* | (2006.01) | |
| *G01S 15/88* | (2006.01) | |
| *G01S 15/89* | (2006.01) | |
| G01S 17/08 | (2006.01) | |
| G01S 13/58 | (2006.01) | |
| G01S 13/87 | (2006.01) | |
| G01S 13/46 | (2006.01) | |

(52) U.S. Cl.
CPC ............ *G01S 15/06* (2013.01); *G01S 15/46* (2013.01); *G01S 15/74* (2013.01); *G01S 15/87* (2013.01); *G01S 15/88* (2013.01); *G01S 15/89* (2013.01); *G01S 13/58* (2013.01); *G01S 13/878* (2013.01); *G01S 17/08* (2013.01); *G01S 2013/462* (2013.01)

(58) Field of Classification Search
USPC .......... 702/143, 158; 348/46, 28.4; 312/680, 312/54; 367/7, 93
See application file for complete search history.

(56) References Cited

U.S. PATENT DOCUMENTS

| | | |
|---|---|---|
| 5,702,323 A | 12/1997 | Poulton |
| 6,066,075 A | 5/2000 | Poulton |
| 6,243,322 B1 | 6/2001 | Zakarauskas |
| 6,690,618 B2 | 2/2004 | Tomasi et al. |
| 6,857,746 B2 | 2/2005 | Dyner |
| 7,317,819 B2 | 1/2008 | Janes |
| 7,952,962 B2 | 5/2011 | Walley et al. |
| 8,243,141 B2 | 8/2012 | Greenberger et al. |
| 2004/0001182 A1 | 1/2004 | Dyner |
| 2004/0013292 A1 | 1/2004 | Raunig |
| 2005/0020902 A1 | 1/2005 | Janes |
| 2005/0288588 A1 | 12/2005 | Weber et al. |
| 2007/0085828 A1 | 4/2007 | Schroeder et al. |
| 2008/0039199 A1 | 2/2008 | Baer et al. |
| 2008/0311990 A1 | 12/2008 | Chiu et al. |
| 2008/0316863 A1 | 12/2008 | Walley et al. |
| 2009/0017910 A1 | 1/2009 | Rofougaran et al. |
| 2009/0052859 A1 | 2/2009 | Greenberger et al. |
| 2009/0054147 A1 | 2/2009 | Chiu et al. |
| 2009/0170601 A1 | 7/2009 | Chiu et al. |
| 2009/0251996 A1 | 10/2009 | Dijk |
| 2009/0258706 A1 | 10/2009 | Rofougaran et al. |
| 2010/0002550 A1 | 1/2010 | Oumi et al. |
| 2010/0278008 A1* | 11/2010 | Ammar .................. G01S 7/521 367/7 |
| 2011/0141013 A1 | 6/2011 | Matthews |
| 2011/0269517 A1 | 11/2011 | Englert et al. |
| 2012/0055250 A1* | 3/2012 | Hashimoto ............ G01S 7/526 73/597 |
| 2012/0062729 A1 | 3/2012 | Hart et al. |
| 2012/0147705 A1 | 6/2012 | Hick |
| 2012/0224456 A1 | 9/2012 | Visser et al. |
| 2012/0308140 A1 | 12/2012 | Ambrus et al. |
| 2012/0309532 A1 | 12/2012 | Ambrus et al. |
| 2013/0002550 A1* | 1/2013 | Zalewski .............. G06F 3/0304 345/158 |
| 2013/0154930 A1 | 6/2013 | Xiang et al. |
| 2013/0249937 A1 | 9/2013 | Amacker et al. |
| 2013/0254066 A1 | 9/2013 | Amacker et al. |
| 2013/0254646 A1 | 9/2013 | Amacker et al. |
| 2013/0254647 A1 | 9/2013 | Amacker et al. |
| 2013/0254648 A1 | 9/2013 | Amacker et al. |

OTHER PUBLICATIONS

Dijk et al.; "Estimation of 3D Device Position by Analyzing Ultrasonic Reflection Signals"; Nov. 26, 2003; pp. 1-7.

* cited by examiner

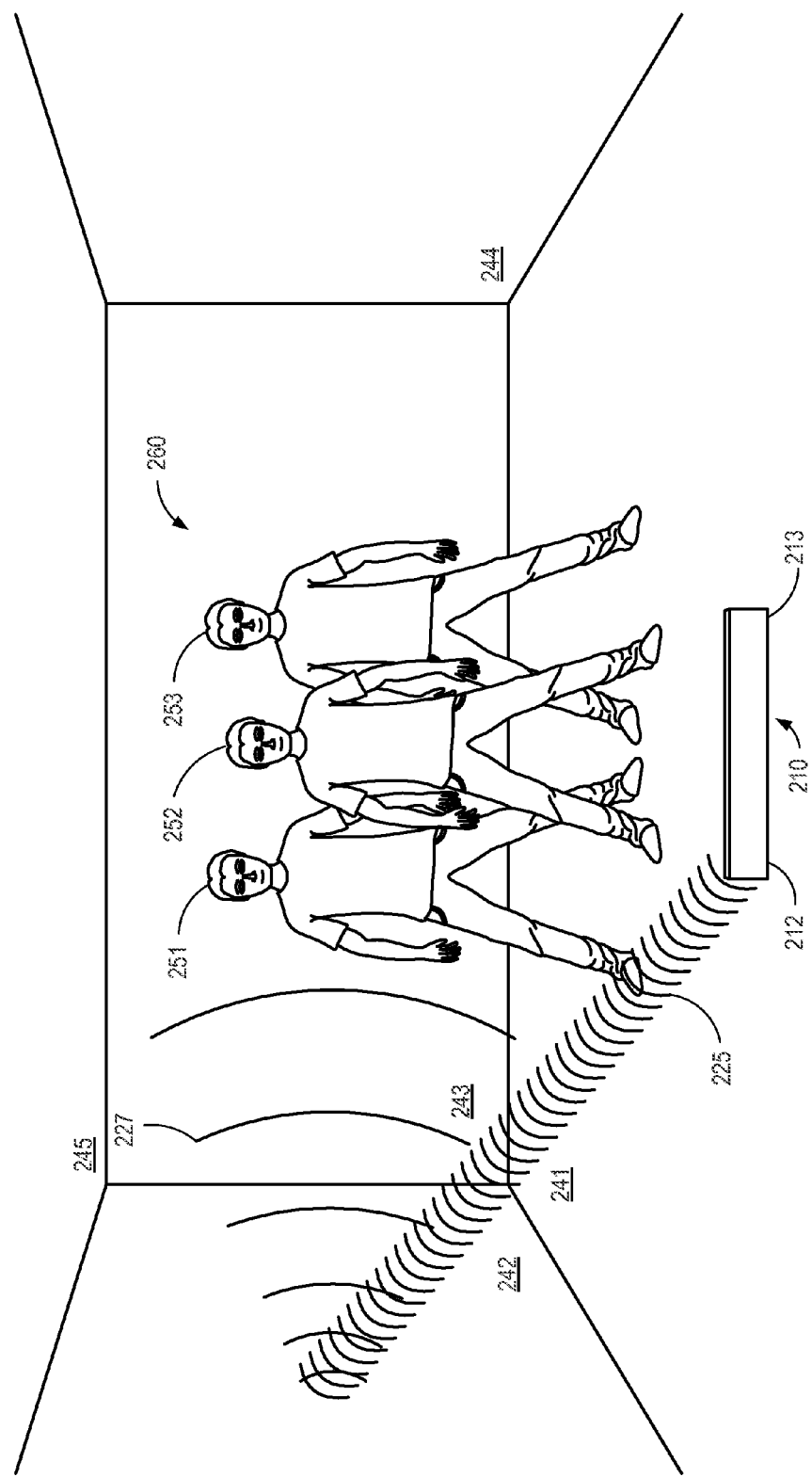

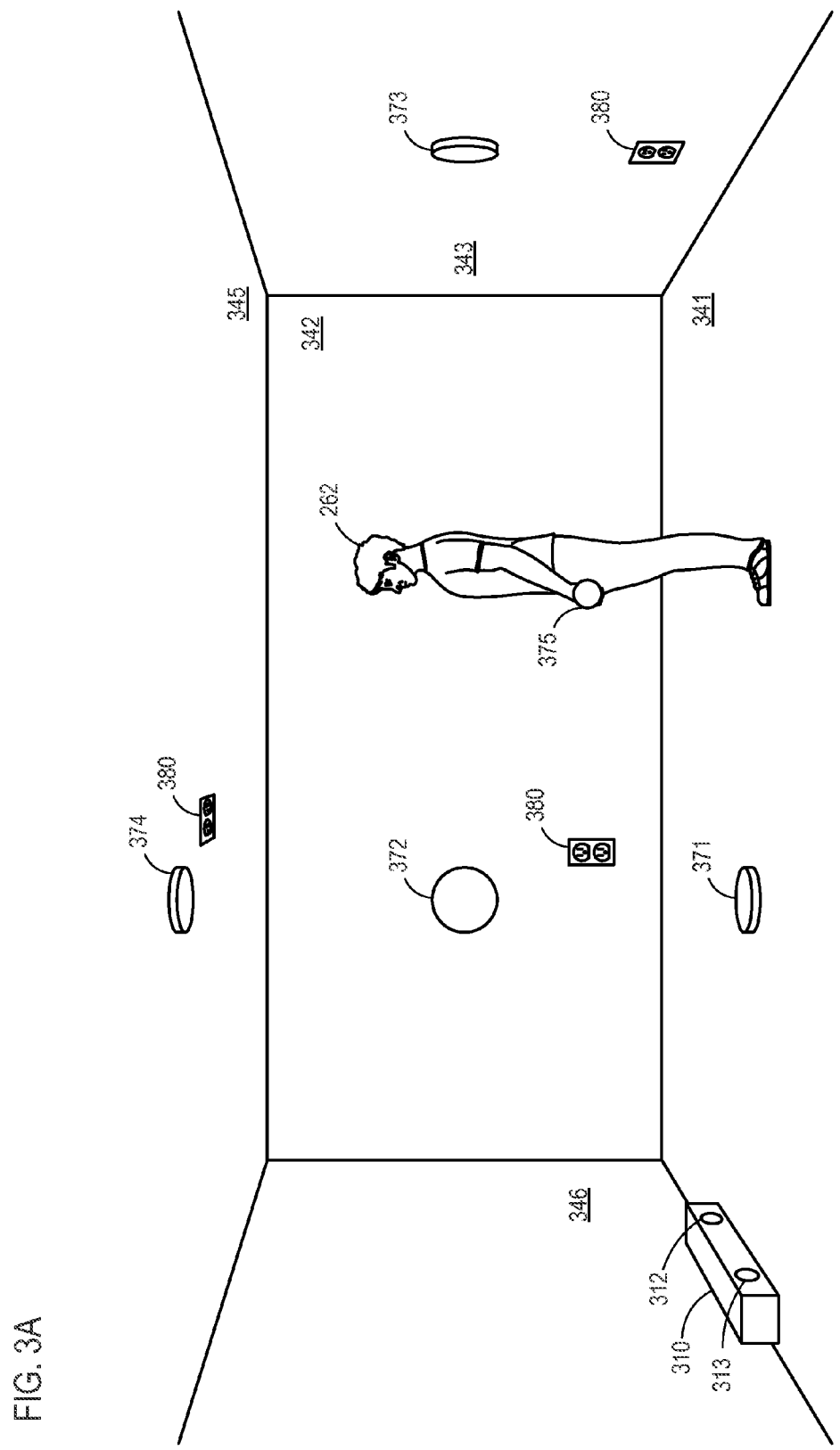

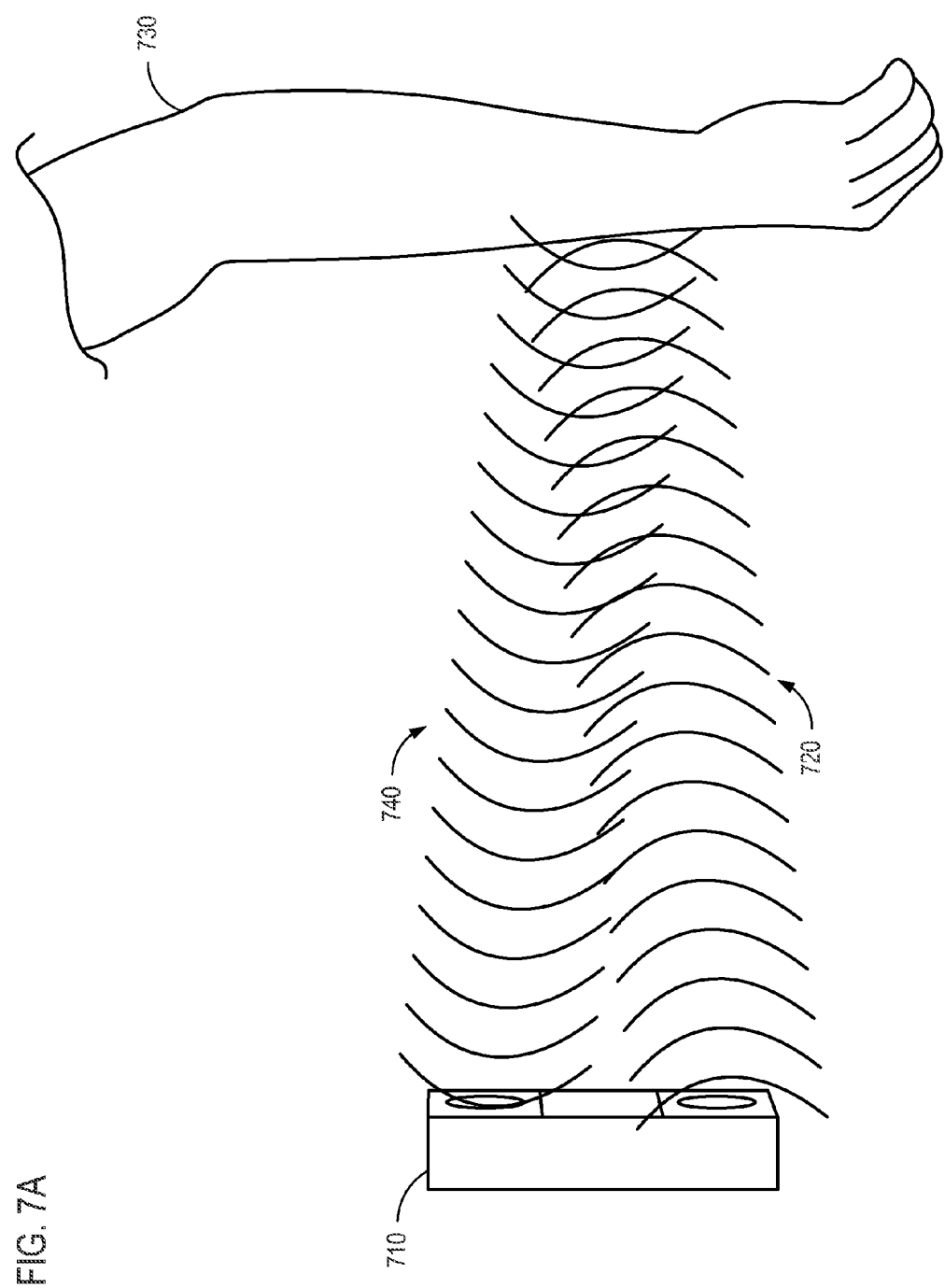

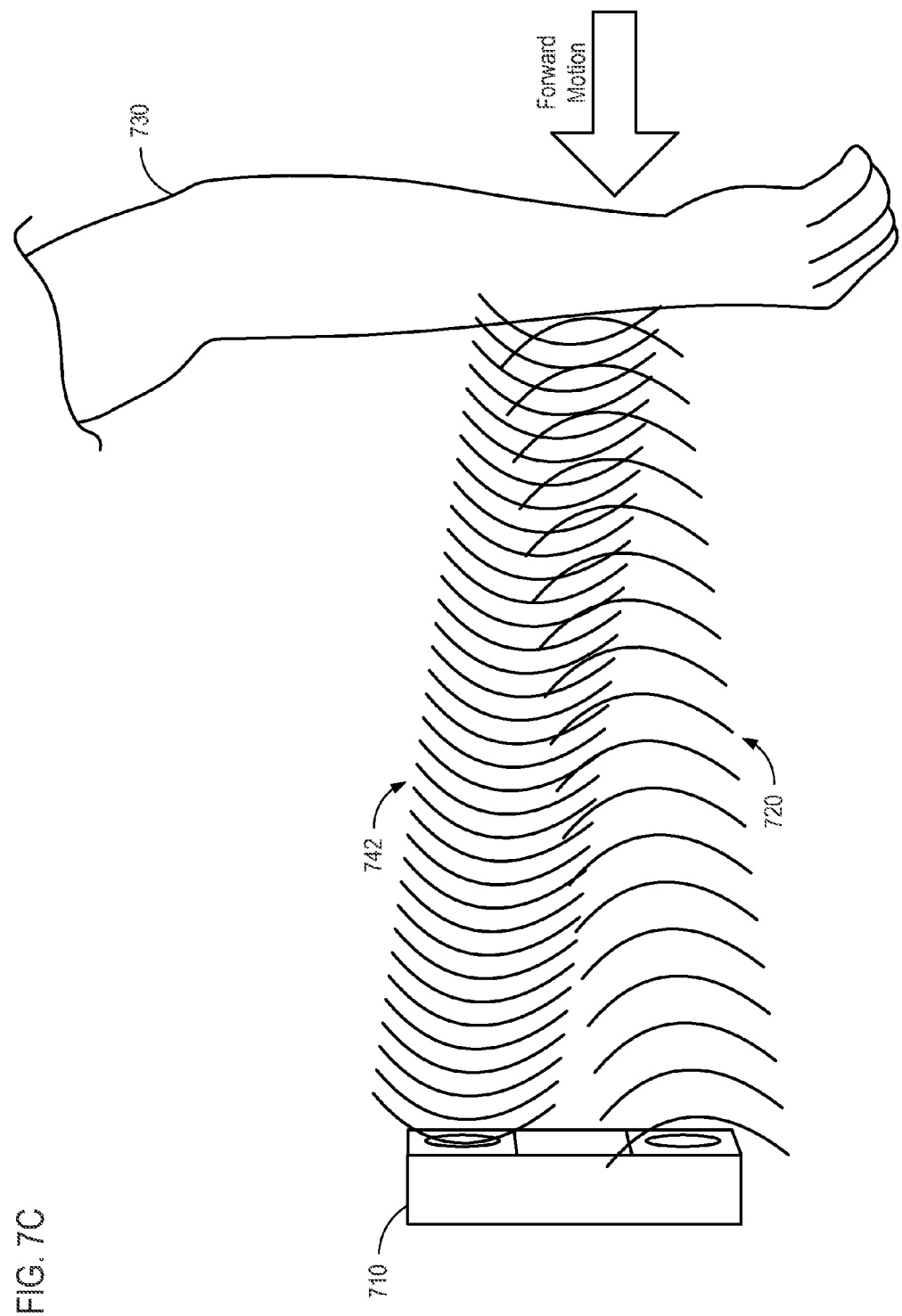

SYSTEMS AND METHODS FOR ULTRASONIC VELOCITY AND ACCELERATION DETECTION

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc., applications of the Priority Application(s)).

PRIORITY APPLICATIONS

None.

RELATED APPLICATIONS

If the listings of applications provided herein are inconsistent with the listings provided via an ADS, it is the intent of the Applicants to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

This application is related to U.S. patent application Ser. No. 14/203,401, filed on Mar. 10, 2014, titled SYSTEMS AND METHODS FOR ULTRASONIC POSITION AND MOTION DETECTION, which application is hereby incorporated by reference in its entirety.

TECHNICAL FIELD

This disclosure relates to systems and methods for determining relative velocity and/or acceleration data of objects. Specifically, this disclosure provides systems and methods for using velocity and/or acceleration in combination with, for example, entertainment devices.

SUMMARY

A system may include one or more ultrasonic transmitters and/or receivers. In some embodiments the transmitter(s) and/or receiver(s) may be embodied as one or more transceivers. An ultrasonic transmitter may be configured to transmit ultrasound into a region bounded by one or more surfaces. The ultrasonic receiver may receive direct ultrasonic reflections from one or more objects within the region. A Doppler shift may be detected for ultrasound reflections from the object. Positional data of an object may be determined using an electromagnetic reflection.

For example, in various embodiments, a system may be configured to receive, via an electromagnetic receiver, an electromagnetic reflection from an object within a region. The system may then determine a relative position of the object within the region using the received electromagnetic reflection. An ultrasonic transmitter may transmit ultrasound into the region. One or more ultrasonic receivers may receive an ultrasonic reflection of the transmitted ultrasound from a site on the object within the region. The system may then detect a shift of the received ultrasonic reflection relative to the transmitted ultrasound. A processor of the system may then calculate a first velocity component associated with the site based on the detected shift of the received ultrasonic reflection. A state of an entertainment device may be modified based on the relative position of the object and the first velocity component of the site.

In some embodiments, the relative position of the object may be determined using ultrasound instead of or in addition to electromagnetic reflections. Moreover, the ultrasonic receiver may receive rebounded ultrasonic reflections from one or more objects within the region. For instance, the receiver may receive ultrasound that reflects off one or more of the surfaces and then off one or more objects prior to being received by the ultrasonic receiver. Similarly, the receiver may receive ultrasound that reflects off one or more objects and then off one or more of the surfaces prior to being received by the ultrasonic receiver.

A system may generate positional data associated with one or more of the object(s) based on the direct ultrasonic reflection. The mapping or positioning system may also generate positional data using the rebounded ultrasonic reflection of the object(s) from the one or more surfaces. It will be appreciated that a rebounded ultrasonic reflection from a surface may be rebounded off the surface first and then the object, or off the object first and then the surface.

The mapping or positioning system may then generate enhanced positional data by combining the direct positional data and the rebounded positional data. The enhanced positional data may be a concatenation of the direct and rebounded positional data or a simple or complex function of the direct and rebounded positional data. The enhanced positional data may be further enhanced or augmented using additional positional data obtained via direct or rebounded ultrasonic reflections and/or other positional data, such as positional data obtained via other means (e.g., laser detection, cameras, etc.).

A shift of the received ultrasonic reflection may be detected. For example, the shift may include: a phase shift, a frequency shift, and/or a timing delay. The detected Doppler shift may be used to determine a velocity and/or acceleration of the site on the object.

A system may calculate velocity and/or acceleration data associated with one or more of objects based on a direct ultrasonic reflection or a rebounded ultrasonic reflection from the one or more surfaces. It will be appreciated that a rebounded ultrasonic reflection from a surface may be rebounded off the surface first and then the object, or off the object first and then the surface.

It will also be appreciated that more complex rebound situations may be possible, e.g., a rebounded ultrasonic reflection may be rebounded off a first surface, then off an object, and then again from the first surface and/or from any number of additional surfaces any number of times before being received by the positioning system.

The system may generate enhanced positional data and calculate velocity data and/or acceleration data by combining direct positional/velocity/acceleration data and the rebounded positional/velocity/acceleration data. Positional data may be enhanced or augmented using additional positional data obtained via direct or rebounded ultrasonic reflections and/or other positional data, such as positional data obtained via other systems (e.g., laser detection, cameras, etc.). Similarly, velocity and/or acceleration data may be enhanced or augmented using additional velocity and/or acceleration data obtained via direct or rebounded ultrasonic reflections and/or other velocity and/or acceleration data, such as velocity and/or acceleration data obtained via other systems (e.g., laser detection, cameras, etc.).

In various embodiments, one or more local, remote, or distributed systems and/or system components may transmit ultrasound via an ultrasonic transmitter into a region. The received ultrasound may include both direct reflections and rebounded reflections. Positional, velocity, and/or acceleration data from one or both of direct reflections and rebounded reflections may be used to obtain positional data that more accurately and/or more quickly describes the relative positional data of one or more objects within the region. As described herein velocity and/or acceleration data may be calculated using a detected shift of one or more ultrasonic reflections, such as, for example, a Doppler frequency shift of the ultrasonic reflection(s).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2A illustrates a positioning system rebounding ultrasound off the wall and then toward the three persons.

FIG. 3A illustrates a plurality of ultrasonic reflectors configured to facilitate the transmission, reflection, and/or reception of rebounded ultrasound by the positioning system.

FIG. 7A illustrates an ultrasonic system transmitting and receiving reflected ultrasound from a stationary object.

FIG. 7C illustrates an ultrasound system transmitting ultrasound at a first frequency and receiving reflected ultrasound at a second frequency from an object moving toward the ultrasound system.

DETAILED DESCRIPTION

Figure 1A:
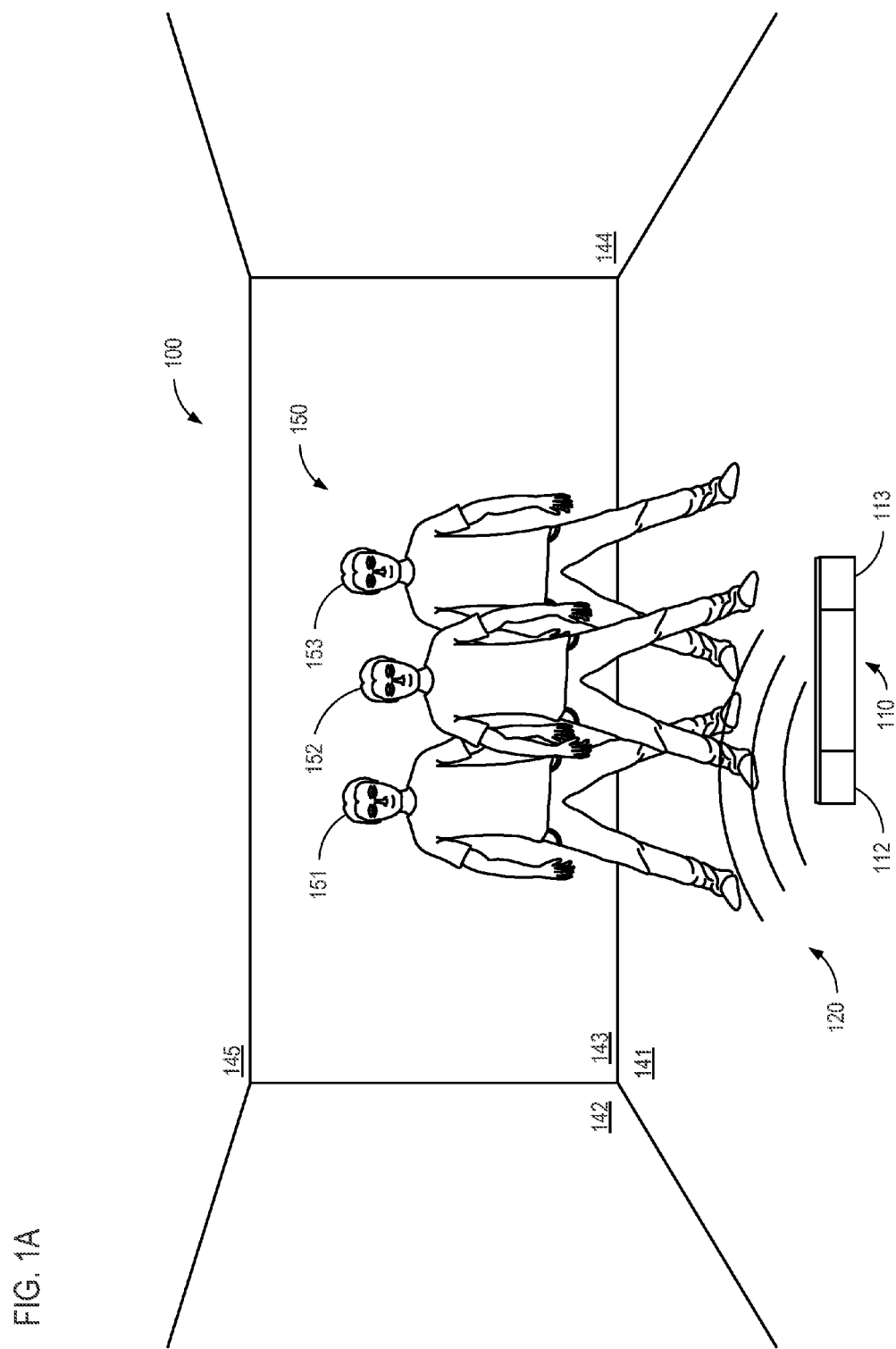
FIG. 1A illustrates a positioning system transmitting ultrasound toward three persons within a bounded region.

A system may include one or more ultrasonic transmitters and/or receivers. In some embodiments the transmitter(s) and/or receiver(s) may be embodied as one or more transceivers. An ultrasonic transmitter may be configured to transmit ultrasound into a region bounded by one or more surfaces. The ultrasound may be between 20 kHz and 250 kHz. In one embodiment, the ultrasound is specifically between 35 kHz and 45 kHz.

One or more of the ultrasonic transmitters, receivers, and/or transceivers may comprise an ultrasonic transducer that may be part of a single transducer system or an array of transducers. The ultrasonic transducer may comprise a piezoelectric transducer. The ultrasonic receiver may comprise a first ultrasonic transducer configured to receive direct ultrasonic reflections and a second ultrasonic transducer to receive rebounded ultrasonic reflections. One or more transducers may be configured transmit and/or receive directional ultrasound, focused ultrasound, or ultrasound from a phased array of transducers.

In some embodiments, the transducers may comprise or be made from metamaterials. A flat sub-wavelength array of ultrasonic transducers may be used in conjunction with the embodiments described herein, such as those utilizing arrays of metamaterials.

In some embodiments, the direct ultrasound may be reflected from a first portion of an object and the rebounded ultrasound may be reflected from a second, different portion of the object. Positional data may be determined using the received ultrasonic reflections. Direct positional data may correspond to a first directional component of the position of the object and the rebounded positional data may correspond to a second directional component of the position of the object. Similarly, one or more direct and/or rebounded ultrasonic reflections may be used to determine velocity and/or acceleration. For example, velocity and/or acceleration information may be determined using a Doppler shift that corresponds to a motion of the reflecting object.

In some embodiments, received ultrasonic reflections (direct or rebounded) may be used to determine positional data. Positional data sampled at various times may be used to determine and/or estimate current and/or future velocity and/or acceleration information associated with an object. For example, a velocity estimate can be formed by dividing the difference between positional data at two different times by the time interval between the two different times. Similarly, an acceleration estimate can be formed by dividing the difference between velocity data at two different times by the time interval between the two different times. Positional data corresponding to a sequence of different times can be curve fit to develop a velocity estimate (i.e., a slope of the curve fit) and/or an acceleration estimate (i.e., a curvature of the curve fit). In other embodiments, as described herein, velocity information may be calculated based on a detected shift in ultrasound reflected by an object.

For example, a system may detect a Doppler shift in ultrasound reflected by an object relative to the transmitted ultrasound. A shift to a longer wavelength may indicate that the object is moving away from the ultrasonic receiver. A shift to a shorter wavelength may indicate that the object is moving toward the ultrasonic receiver. The detected shift may be related to a frequency shift, a wavelength shift, a phase shift, a time-shifted reflection, and/or other ultrasonic shift. An acceleration estimate can be formed by comparing such velocity information at different times, e.g., by dividing the difference between velocities at two different times by the time interval between the two different times, or by curve fitting a time sequence of velocity data and determining the slope of the curve fit.

Any number of direct and/or rebounded ultrasonic reflections may be obtained from one or more objects within a region to obtain velocity and/or acceleration data over a period of time and/or to obtain more accurate velocity and/or acceleration data with multiple data points. The transmitted ultrasound may be transmitted as directional or non-directional ultrasonic pulses, continuously, in a modulated (frequency, amplitude, phase, etc.) fashion, and/or other format. The ultrasonic transmissions may be spaced at regular intervals, on demand, and/or based on the reception of a previously transmitted ultrasonic transmission. Direct and rebounded ultrasound pulses may be transmitted at the same time, or either one can be transmitted before the other.

Rebounded ultrasonic reflections may be defined as ultrasonic reflections that, in any order, reflect off at least one surface in addition to the object. For example, the rebounded ultrasonic reflections may be reflected off any number of surfaces and/or objects (in any order) prior to being received by the ultrasonic receiver.

A mapping or positioning system may generate positional data associated with one or more of the object(s) based on the direct ultrasonic reflection(s) and/or the rebounded ultrasonic reflection(s). The positional data may comprise a centroid of the objects, a two-dimensional mapping of the object, an image of the object, a false-color representation of the object, an information representation (blocks, squares, shadows, etc.) of the object, a three-dimensional mapping of the object, one or more features of the object, and/or other information.

The velocity and/or acceleration data may be defined with respect to one or more surfaces of the region, the ultrasonic velocity/acceleration system, a receiver of the system, and/or a transmitter of the system. The one or more objects within the region may comprise machinery, robots, furniture, household property, people in general, gamers, human controllers of electronic devices, electronic devices, fixtures, and/or other human or non-human objects.

The object may comprise a specific portion of a person, such as a hand, finger, arm, leg, foot, toe, torso, neck, head, mouth, lip, or eye. In some embodiments, rebounded ultrasonic transmissions may be reflected off an ultrasonic reflector disposed within the room. In some embodiments, the ultrasonic reflectors may be mounted and/or otherwise positioned within the region. In other embodiments, the ultrasonic reflectors may be held, worn, and/or otherwise in the position of the user or operator of the ultrasonic positioning system. The ultrasonic reflectors may modify a characteristic of the reflected ultrasound, facilitating the identification of the received rebounded ultrasonic reflections.

Ultrasonic reflectors may comprise passive, active, and/or actively moved/pivoted ultrasonic reflectors for controlling the direction in which ultrasound rebounds and/or otherwise travels within the region. For example, the ultrasonic reflector may be configured to modify one or more of the frequency, phase, and/or amplitude of the rebounded ultrasound. The modified characteristic may facilitate the differentiation of the direct ultrasonic reflections and the rebounded ultrasonic reflections. In some embodiments the direct and rebounded signals can be differentiated using knowledge of the transmission or reception directions of the respective beams. In some embodiments, the direct and rebounded signals can be differentiated using knowledge of the time-of-flight of the respective beams. In some embodiments, the direction of a reflected beam (and hence directional characteristics of its delivered positional information) can be determined by knowledge of the orientation of the reflecting surface and its reflective characteristics. For example, ultrasonic reflection from a surface may be dominated by specular reflection, thereby allowing straightforward determination of the rebound geometry.

The mapping or positioning system may generate positional and/or motion data. The system may also generate velocity and/or acceleration data using the rebounded ultrasonic reflection of the object(s) from the one or more surfaces. It will be appreciated that a rebounded ultrasonic reflection from a surface may be rebounded off the surface first and then the object, or off the object first and then the surface.

The mapping or positioning system may then generate enhanced positional data by combining the direct positional data and the rebounded positional data. The enhanced positional data may be a concatenation of the direct and rebounded positional data or a simple or complex function of the direct and rebounded positional data.

For example, in one embodiment, the direct and rebounded positional data may comprise only time-of-flight information, which based upon air sound-speed can be converted to transit distance information for each beam. In such embodiments, the direct positional data provides a range from the transceiver to the object, i.e., leaving the position undefined along a two-dimensional spherical surface. Each potential object position along this spherical surface leads, e.g., assuming specular reflections, to a distinct time-of-flight for the rebounded beam from one surface (wall, ceiling, floor); this restricts the locus of possible object positions to a one-dimensional arc along the spherical surface, thereby improving the positional estimate.

The mapping or positional system can further refine the positional data by analyzing rebound data from a second surface. In the current example, each potential object position along the spherical surface (obtained by the time-of-flight of the direct beam) defines a first time-of-flight for ultrasound rebounded from the first surface and a second time-of-flight for ultrasound rebounded from the second surface; knowledge of both times-of-flight determines the object's position. It is clear that time-of-flight data from other surfaces can, by "over defining" the problem can improve the positional estimate, e.g., by reducing sensitivity to measurement errors, to the effects of diffuse reflections, etc. In other embodiments, the direct and rebounded positional data may comprise directional information.

For example, directional information for direct ultrasound can identify that the object (or a specified portion of it) lies along a known ray, thereby providing two components of its position. Information from rebounded ultrasound can then provide additional positional data sufficient to identify the third component of the object's position, i.e., its location along the ray. The rebounded ultrasound may provide time-of-flight information; each object location along the ray corresponds to a different time-of-flight for rebounded ultrasound from a surface, so the measured time-of-flight identifies the object's location. The rebounded ultrasound may provide directional information (either for transmission or reception); the intersection of this rebound ray with the direct ray serves to identify the object's location.

The enhanced positional data may be further enhanced or augmented using additional positional data obtained via direct or rebounded ultrasonic reflections and/or other positional data, such as positional data obtained via other means (e.g., laser detection, cameras, etc.). The direct and the rebounded positional data may provide positional data for the object at the same or at different times, depending on the time at which they are reflected from the object. The enhanced positional data may be analyzed using a dynamical model, e.g., a Kalman filter, designed to combine positional data corresponding to different times or directional components, using them together with, and to improve, estimates of the object's motion.

In some embodiments, direct ultrasonic reflections may not be used. Rather, a first rebounded ultrasonic reflection and a second rebounded ultrasonic reflection may be used to generate positional data. It is appreciated that any number of direct or rebounded ultrasonic reflections may be used to identify a position and/or movement of an object within a region. In various embodiments, the positional data gathered using ultrasonic reflections may be combined with other positional data, such as infrared, positional data provided by manual input, echo location, sonar techniques, laser, and/or the like.

In various embodiments, one or more local, remote, or distributed systems and/or system components may transmit ultrasound via an ultrasonic transmitter into a region. The received ultrasound may include both direct reflections and rebounded reflections. Positional data from both the direct reflections and the rebounded reflections may be used to obtain positional data that more accurately and/or more quickly describes the relative positional data of one or more objects within the region.

As described above, the system may also generate velocity and/or acceleration data using the rebounded ultrasonic reflection of the object(s) from the one or more surfaces. It is appreciated that a rebounded ultrasonic reflection from a surface may be rebounded off the surface first and then the object, or off the object first and then the surface.

The system may then generate enhanced velocity and/or acceleration data by combining the direct velocity and/or acceleration data and the rebounded velocity and/or acceleration data. The enhanced velocity and/or acceleration data may be a concatenation of the direct and rebounded velocity and/or acceleration data or a simple or complex function of the direct and rebounded velocity and/or acceleration data.

For example, a Doppler frequency shift for direct ultrasound reflecting from an object can identify the vector component of the object's velocity along the direction of the direct ultrasound. Doppler information from rebounded ultrasound can then provide additional velocity along the rebound direction sufficient to identify another component of the object's velocity. As discussed above, velocity data from different times can then be used to determine acceleration data.

The enhanced velocity and/or acceleration data may be further enhanced or augmented using additional velocity and/or acceleration data obtained via direct or rebounded ultrasonic reflections and/or other velocity and/or acceleration data, such as velocity and/or acceleration data obtained via other means/systems/methods (e.g., laser detection, cameras, etc.). The direct and the rebounded velocity and/or acceleration data may provide velocity and/or acceleration data for the object at the same or different times, depending on the time at which they are reflected from the object. The enhanced positional data may be analyzed using a dynamical model, e.g., a Kalman filter, designed to combine velocity and/or acceleration data corresponding to different times or directional components, using them together with, and to improve, estimates of the object's present and/or future motion.

In some embodiments, direct ultrasonic reflections may not be used. Rather, a first rebounded ultrasonic reflection and a second rebounded ultrasonic reflection may be used to generate velocity and/or acceleration data. It is appreciated that any number of direct or rebounded ultrasonic reflections may be used to identify a position, velocity, acceleration, and/or other movement information of an object within a region. In various embodiments, the velocity and/or acceleration data gathered using ultrasonic reflections may be combined with other velocity and/or acceleration data, such as infrared, velocity and/or acceleration data provided by manual input, echo location, sonar techniques, laser, and/or the like.

In various embodiments, one or more local, remote, or distributed systems and/or system components may transmit ultrasound via an ultrasonic transmitter into a region. The received ultrasound may include both direct reflections and rebounded reflections. Velocity and/or acceleration data from both the direct reflections and the rebounded reflections may be used to obtain velocity and/or acceleration data that more accurately and/or more quickly describes the relative velocity and/or acceleration data of one or more objects within the region.

The relative position information as well as the velocity and/or acceleration data can be used to modify the state of an entertainment device. The position, velocity, and/or acceleration data can denote position and motion of a user of the entertainment device, or of parts of the user (e.g., denoting hand motions, posture, gait, facial expression, etc.). The position, velocity, and/or acceleration data can denote position and motion of an object carried or worn by a user of the entertainment device (e.g., a device controller, wearable ultrasound reflectors, etc.). The position, velocity, and/or acceleration data can denote position and motion of other objects or people in the vicinity of the entertainment device (e.g., furniture, acquaintances, pets, etc.). In one embodiment, the entertainment device can comprise a system for playing video games.

The position, velocity, and/or acceleration data can be used to deliver a user response to a game situation, thereby modifying game action and hence the state of the video game (e.g., of game software, of game video content displayed on a monitor, of game audio emitted from speakers or user earphones). In an embodiment, the entertainment device can comprise a system for providing video or audio content to a user (e.g., a television, a stereo, a DVD player, etc.). The position, velocity, and/or acceleration data can be used to deliver a user command to the system (e.g., to stop providing a given content, to start providing a given content, to change an audio volume, to change a display brightness, to fast forward, to rewind, etc.). The position, velocity, and/or acceleration data can be used to deliver a user response to content displayed by the system (e.g., to show approval, disapproval, etc.).

The entertainment device can provide a signal which (partially or completely) controls one or more aspects of the position and velocity measuring system. In an embodiment, the signal can be used to cause the measuring system to take or provide a new position, velocity, or acceleration measurement to the entertainment device. In this way the entertainment device can control the timing of measurements, the location of the measurements (i.e., what part of a user or object is being measured), and/or the type of measurement (e.g., position, velocity, acceleration, vector component, etc.).

For example, an entertainment device may prioritize measurements of a user's hands. In another example, after a game system has displayed an action (e.g., swung a sword at a user's character) it may command increased measurements of the user to determine his response. In a further example, an entertainment device may have (based on previous measurements of the user) a computational model of the user's position or motion. The entertainment device may determine that some aspects of this model are less accurate than others, and hence provide a signal to the measuring system to acquire additional measurements to improve the accuracy of the less accurate portions of the model. For instance, it may command Doppler measurements to provide more accurate motion estimates than available from differential positional measurements, it may command use of rebounded ultrasound to measure position or motion of obscured parts of the user, etc.

The signal from the entertainment device and/or an associated control device may be used to control ultrasound transmission by an ultrasound transmitter. This signal can control the time of the transmission, the direction of the transmission, the frequency of the transmitted ultrasound, etc. The signal can be used to control operation of an ultrasound receiver. This signal can control the time at which to detect ultrasound, the directional sensitivity of the receiver, the frequency to be detected, etc. The transmitter or receiver being controlled can be used for determining relative position (using direct or rebounded ultrasound) or for measuring one or more velocity components by detecting shifts in reflected ultrasound. The signal from the entertainment device can be used to control an electromagnetic source (e.g., an LED, a laser, a radar transmitter, etc.) and/or an electromagnetic receiver (e.g., a camera, a radar detector, a phased array, etc.). The signal can control the timing, directivity, radiation frequency, radiation polarization, etc.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers, computer programming tools and techniques, computer networks and networking technologies, digital storage media, authentication, access control, and other security tools and techniques provided by public keys, encryption, firewalls, and/or other means.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1A illustrates a positioning system 110 transmitting ultrasound 120 toward three persons 151, 152, and 153 in a group 150 within a bounded region 100. As illustrated, the bounded region 100 is bounded by a floor 141, a left wall 142, a back wall 143, a right wall 144, and a ceiling 145. A front wall (not shown), may also bound the region 100.

The positioning system 110 may transmit the ultrasound 120 as directional ultrasonic pulses, continuously, in a modulated fashion (frequency, amplitude, phase, etc.), and/or or in another format. The ultrasound 120 may be transmitted directly toward the persons 151, 152, and 153. The ultrasound 120 may be transmitted indirectly toward the persons 151, 152, and 153.

In various embodiments, the positioning system 110 may be any shape or size and/or may comprise a plurality of distributed components. The illustrated embodiment is merely an example and is not intended to convey any information regarding shape, size, configuration, or functionality. In various embodiments, the positioning system 110 may include an array of transducers, such as piezoelectric transducers, configured to transmit and/or receive ultrasound. The positioning system 110 may be configured with a first plurality of transducers 112 (or a single transducer) for transmitting ultrasound and a second plurality of transducers 113 (or a single transducer) for receiving ultrasound.

Figure 1B:
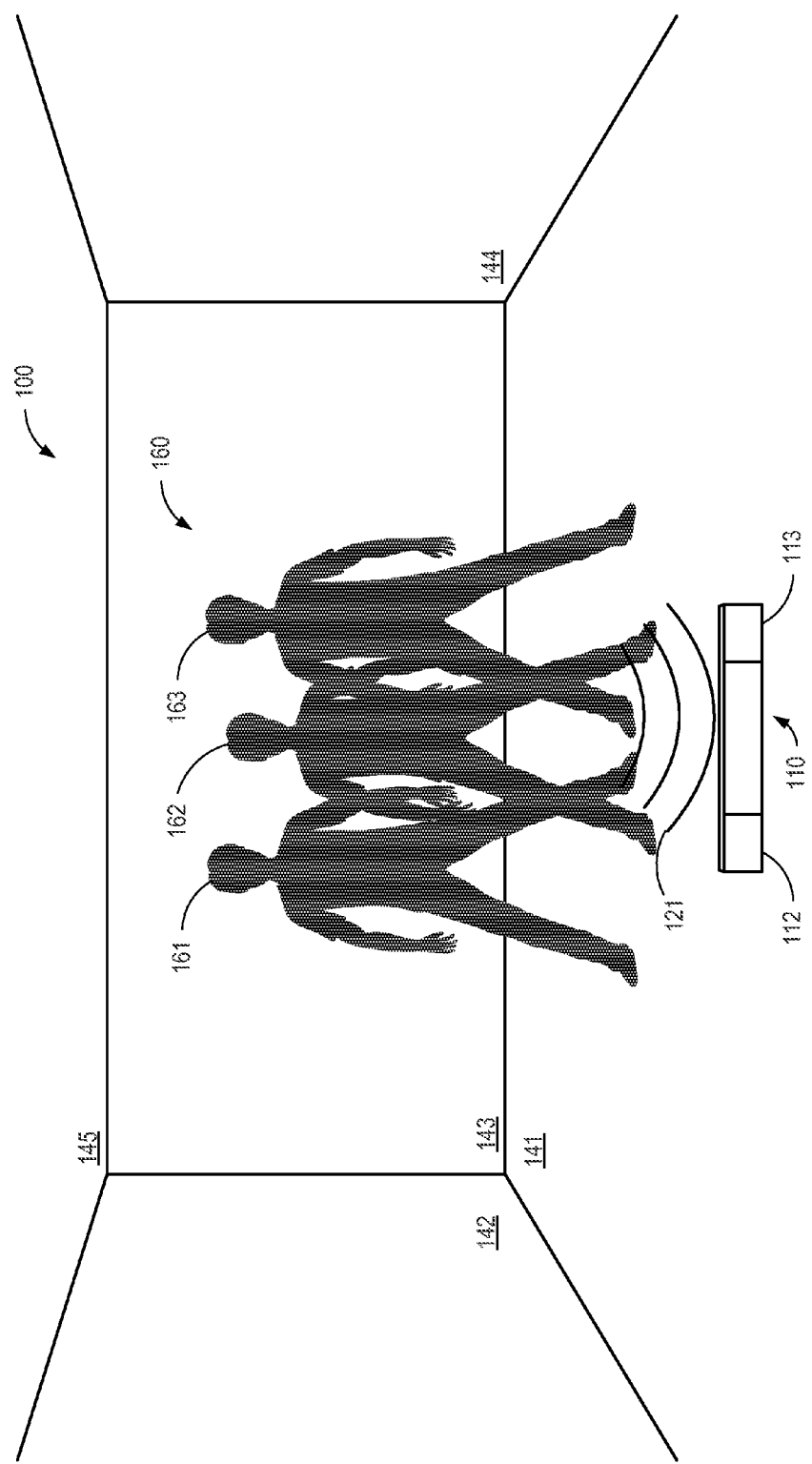
FIG. 1B illustrates a direct ultrasonic reflection received by the positioning system and the resulting "image" generated by the positioning system.

FIG. 1B illustrates a direct ultrasonic reflection 121 received by the positioning system 110. As illustrated, the direct ultrasonic reflection 121 may convey information in a relatively two-dimensional fashion in which the three persons 151, 152, and 153 are viewed as a single object 160, or as three distinct objects (161, 162, and 163) in substantially the same plane. FIG. 1B illustrates a visual representation of the received direct reflection of ultrasound 121. The actual positional data received may be at a higher or lower resolution depending on the sampling rates, accuracy, processing bit depth, frequency(ies) of ultrasound used, etc.

FIG. 2A illustrates a positioning system 210, similar to that described in conjunction with FIGS. 1A and 1B, in which ultrasound 225 is transmitted toward a surface bounding the region 200. In the illustrated embodiment, the rebounding surface is left wall 242. It is appreciated that ultrasound may be rebounded off one or more of left wall 242, floor 241, back wall 243, right wall 244, and/or ceiling 245.

As used herein, the terms rebound and rebounding may include any type of reflection, refraction, and/or repeating that may or may not include a phase, frequency, modulation, and/or amplitude change. Rebounding may be performed by the outer surface of the surface, an inner portion of the surface, or an object disposed on, in, or behind the surface (e.g., exterior paint, drywall, internal metal, studs, interior coatings, mounted panels, etc.).

The ultrasound may ultimately be rebounded 227 to reflect off persons 251, 252, and 253 at a different angle than that obtained in FIGS. 1A and 1B. The illustrated embodiment shows the rebounded ultrasound 227 reflecting off the left wall 242 prior to the persons 251-253. However, the ultrasound may reflect off persons 251-253 prior to the left wall 242 instead. Ultimately, ultrasound 225 may be rebounded and/or reflected by persons 251-253 and one or more of surfaces/walls 241-245 in any order and then be received by positioning system 210.

Figure 2B:
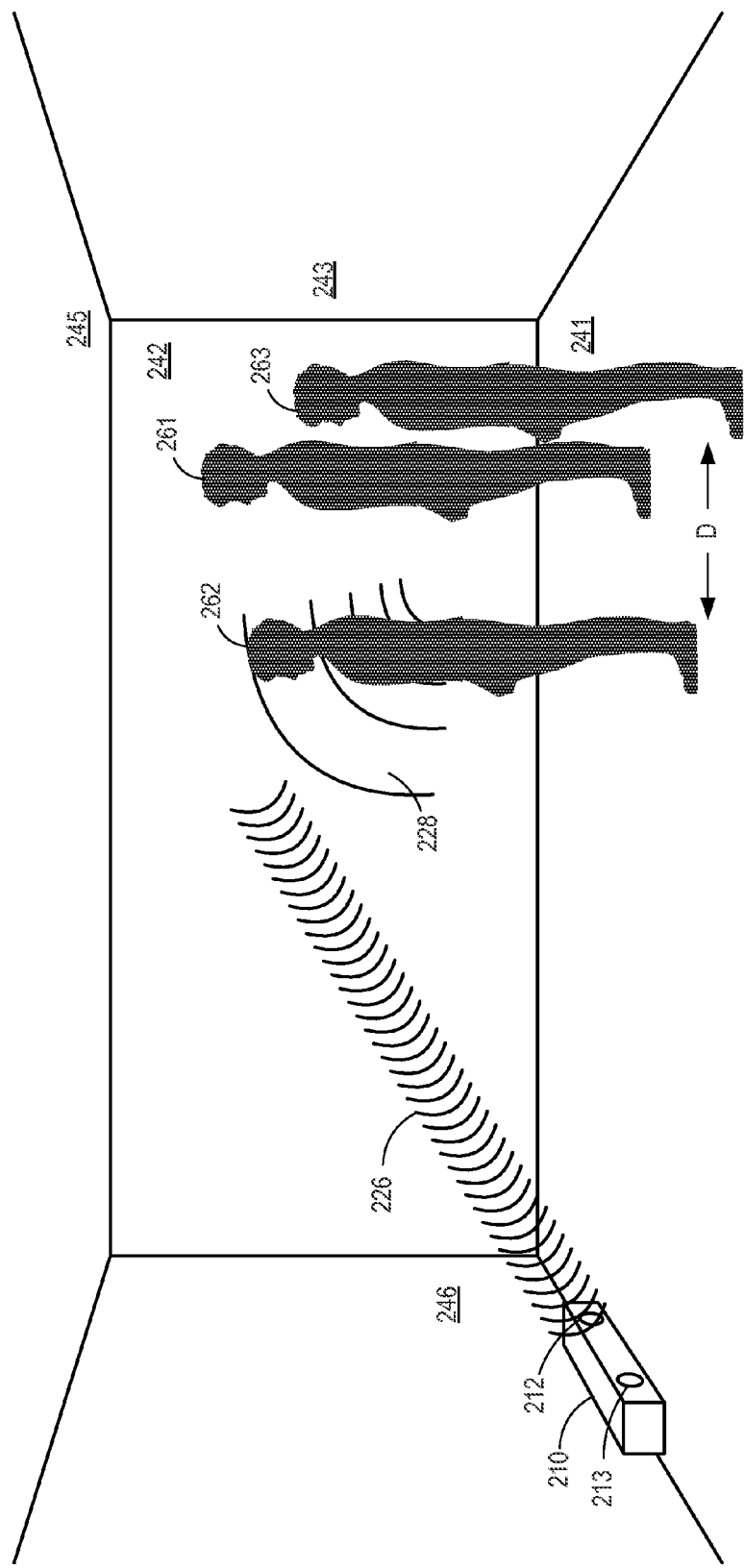
FIG. 2B illustrates a side view of the positioning system rebounding the ultrasound off the wall and then toward the three persons.

FIG. 2B illustrates a side view of the positioning system 210 described in conjunction with FIG. 2A with the rebounded ultrasound 226 being received after reflecting off persons 251-253, at location 228, and rebounding off left wall 242. FIG. 2B also shows a front wall 246. In some embodiments, all of the ultrasound may be transmitted against a front wall 246 to more evenly distribute ultrasound throughout the region (i.e., a wider effective beam width).

As illustrated in FIG. 2B, the positional data obtained by the rebounded ultrasound 226 may provide information not available via the direct reflections shown in FIGS. 1A and 1B, e.g., due to one object preventing direct ultrasound from reaching a second object (or another portion of the first object). For instance, the visual representation of the positional data obtained illustrates three distinct objects 261, 262, and 263 that are clearly in distinct planes relative to the positioning system 210. For instance, the positional data generated based on the rebounded ultrasound in FIG. 2B shows a distance D between object 262 and objects 261 and 263. Such a distance D may be difficult to determine or determined differently if only direct reflections were available (as in FIGS. 1A and 1B).

FIG. 3A illustrates a plurality of ultrasonic reflectors 371, 372, 373, and 374 secured to, mounted to, positioned within, and/or integrally formed with one or more of the surfaces 341, 342, 343, 345, and 346. In some embodiments, a user/subject may hold or otherwise control a portable ultrasonic reflector 375. The ultrasonic reflectors 371-375 may facilitate the transmission, reflection, and/or reception of rebounded ultrasound by the positioning system 310.

The ultrasonic reflectors may comprise passive, active, and/or actively moved/pivoted ultrasonic reflectors for controlling the direction in which ultrasound rebounds and/or otherwise travels within the region. For example, the ultrasonic reflector may be configured to modify one or more of the frequency, phase, and/or amplitude of the rebounded ultrasound. The modified characteristic may facilitate the differentiation of the direct ultrasonic reflections and the rebounded ultrasonic reflections.

The mapping or positing system 310 may generate positional data associated with one or more of the object(s) based on the direct ultrasonic reflection(s) (e.g., FIGS. 1A and 1B) and/or the rebounded ultrasonic reflection(s) (e.g., FIGS. 2A and 2B). The positional data may comprise a centroid of the objects, a two-dimensional mapping of the object, an image of the object, a false-color representation of the object, an information representation (blocks, squares, shadows, etc.) of the object, a three-dimensional mapping of the object, one or more features of the object, and/or other information.

The positional data may be defined with respect to one or more surfaces of the region, the positioning system 310, a receiver of the positioning system 312, and/or a transmitter 313 of the positioning system. The one or more objects within the region may comprise machinery, robots, furniture, household property, people in general, gamers, human controllers of electronic devices, electronic devices, fixtures, and/or other human or non-human objects.

Figure 3B:
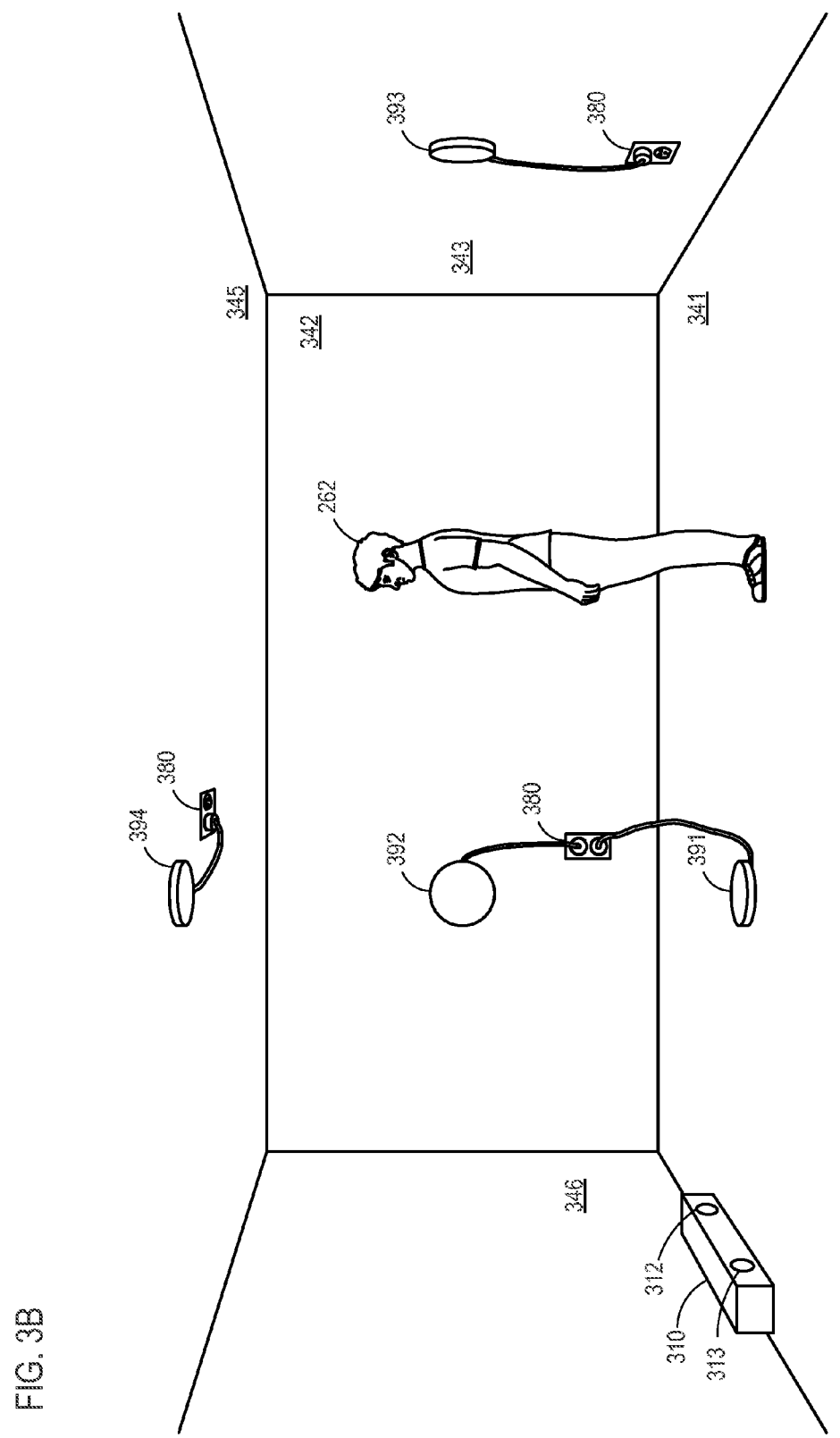
FIG. 3B illustrates a plurality of active ultrasonic reflectors configured to facilitate the transmission, reflection, and/or reception of rebounded ultrasound by the positioning system.

The object may comprise a specific portion of a person, such as a hand, finger, arm, leg, foot, toe, torso, neck, head, mouth, lip, and/or eye. As illustrated in FIGS. 3A and 3B, rebounded ultrasonic transmissions may be reflected off an ultrasonic reflector 371-375 disposed within the room. In some embodiments, the ultrasonic reflectors may modify a characteristic of the reflected ultrasound, facilitating the identification of the received rounded ultrasonic reflections.

FIG. 3B illustrates a plurality of active ultrasonic reflectors 391-394 configured to facilitate the transmission, reflection, and/or reception of rebounded ultrasound by the positioning system. As illustrated, active ultrasonic reflectors 391-394 may be connected to a power source, such as batteries, solar cells, heat converts, outlets 380, and/or other suitable power source. In some embodiments, the ultrasound itself may provide the power source.

Figure 4A:
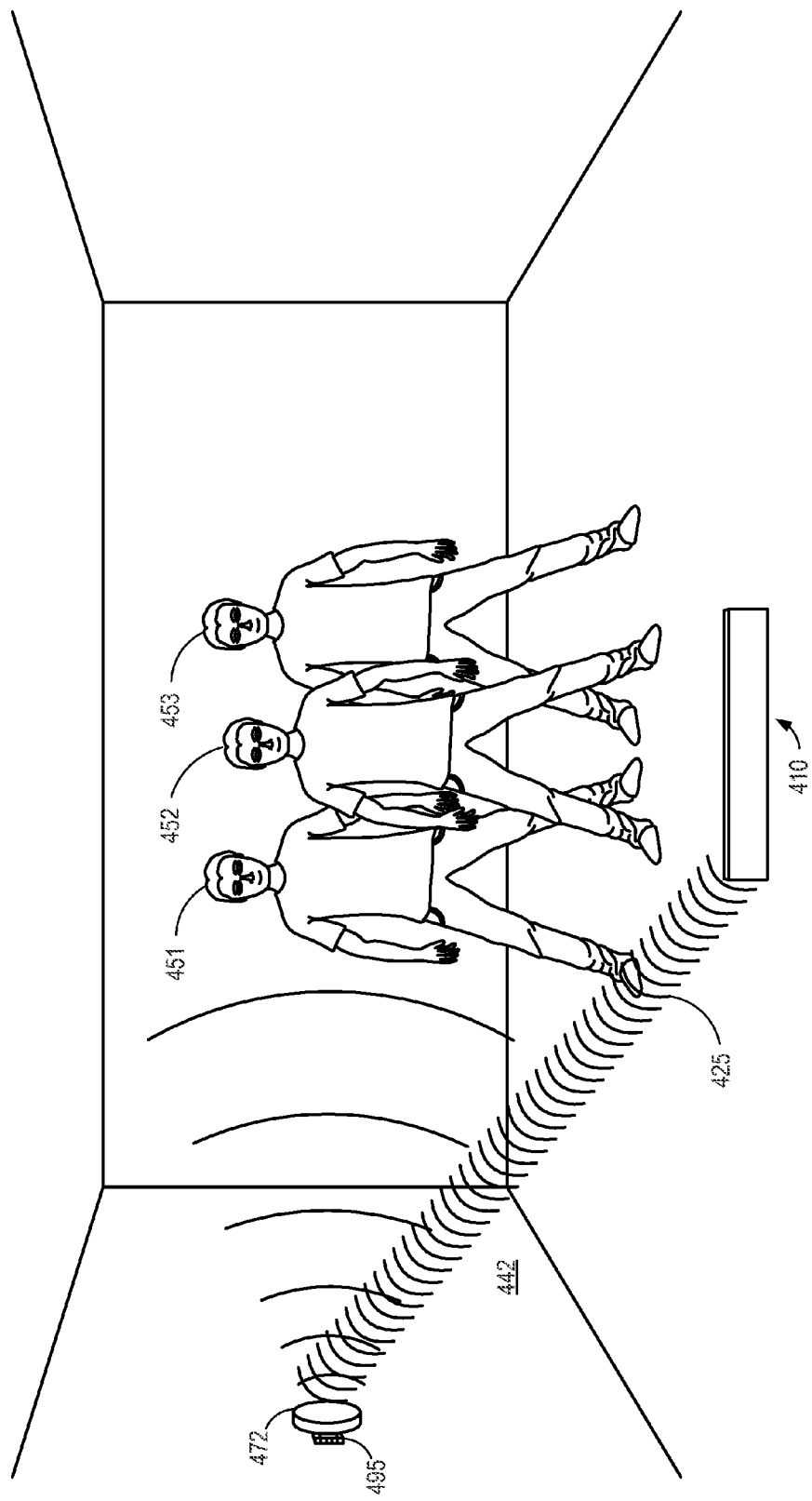
FIG. 4A illustrates an actively controlled ultrasonic reflector in a first position configured to pivot with respect to the wall on which it is mounted to facilitate the transmission, reflection, and/or reception of rebounded ultrasound by the positioning system.

FIG. 4A illustrates an actively controlled ultrasonic reflector 472 in a first position. A positioning system 410 may be in communication with the ultrasonic reflector 472, or the ultrasonic reflector 472 may be autonomous. In various embodiments, the positioning system 410 may transmit ultrasound 425 toward the persons 451, 452, and 453 or toward the wall 442, as illustrated. The ultrasound 425 may then be rebounded off the wall 442 or reflected by the persons 451-453, respectively.

Figure 4B:
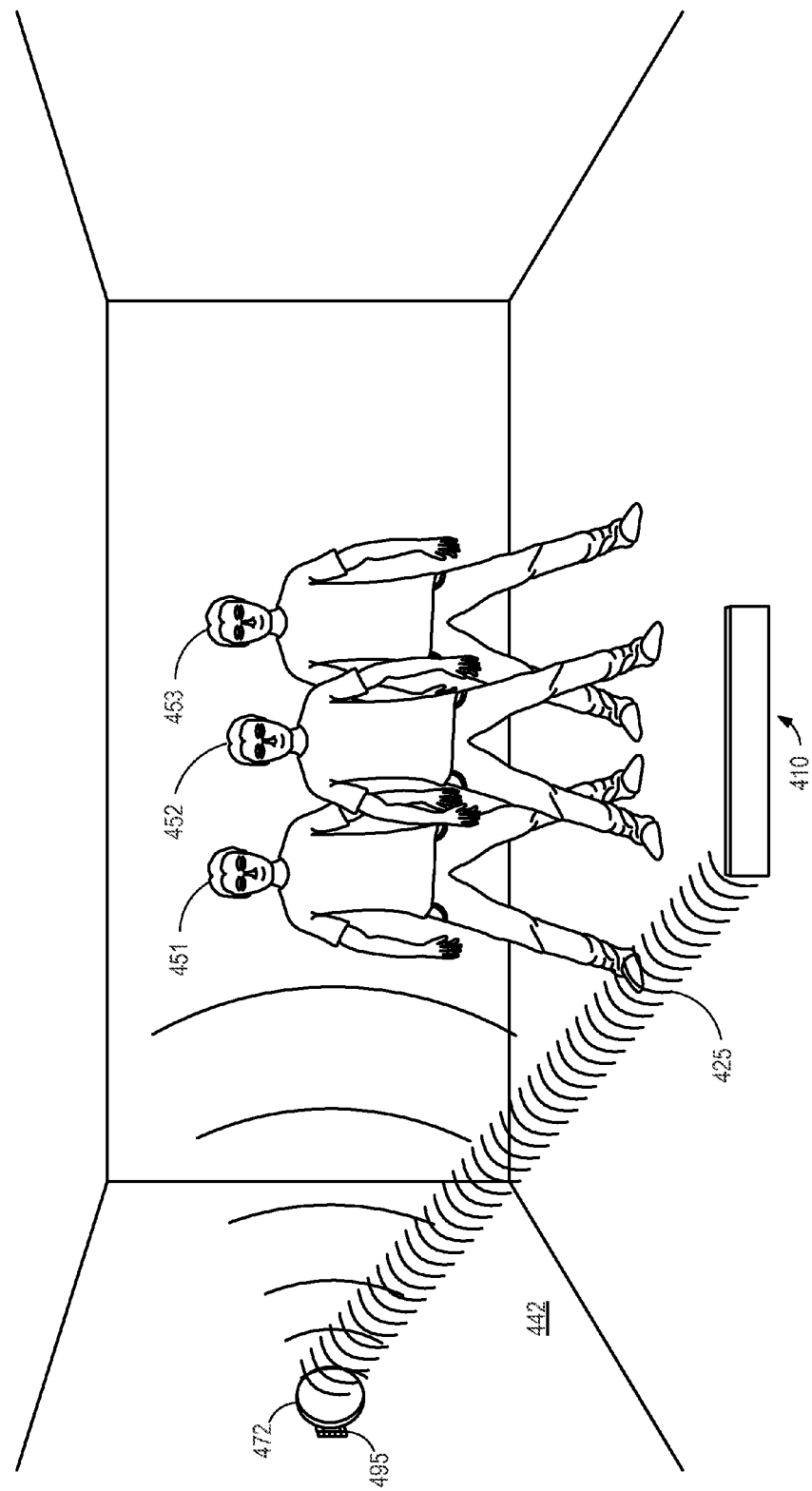
FIG. 4B illustrates the actively controlled ultrasonic reflector in a second position.

FIG. 4B illustrates the actively controlled ultrasonic reflector 472 in a second position. The ultrasonic reflector 472 may be pivoted and/or controlled by a pivot control 495.

In some embodiments, pivot control 495 may change other reflective, absorptive, and/or refractive properties of the ultrasonic reflector 472, in addition to its direction. For example, an ultrasonic reflector 472 may have specific ultrasonic or other acoustic absorptive properties. A pivot control 495 may adjust the pivoting and/or acoustic and/or electrical properties.

Figure 5:
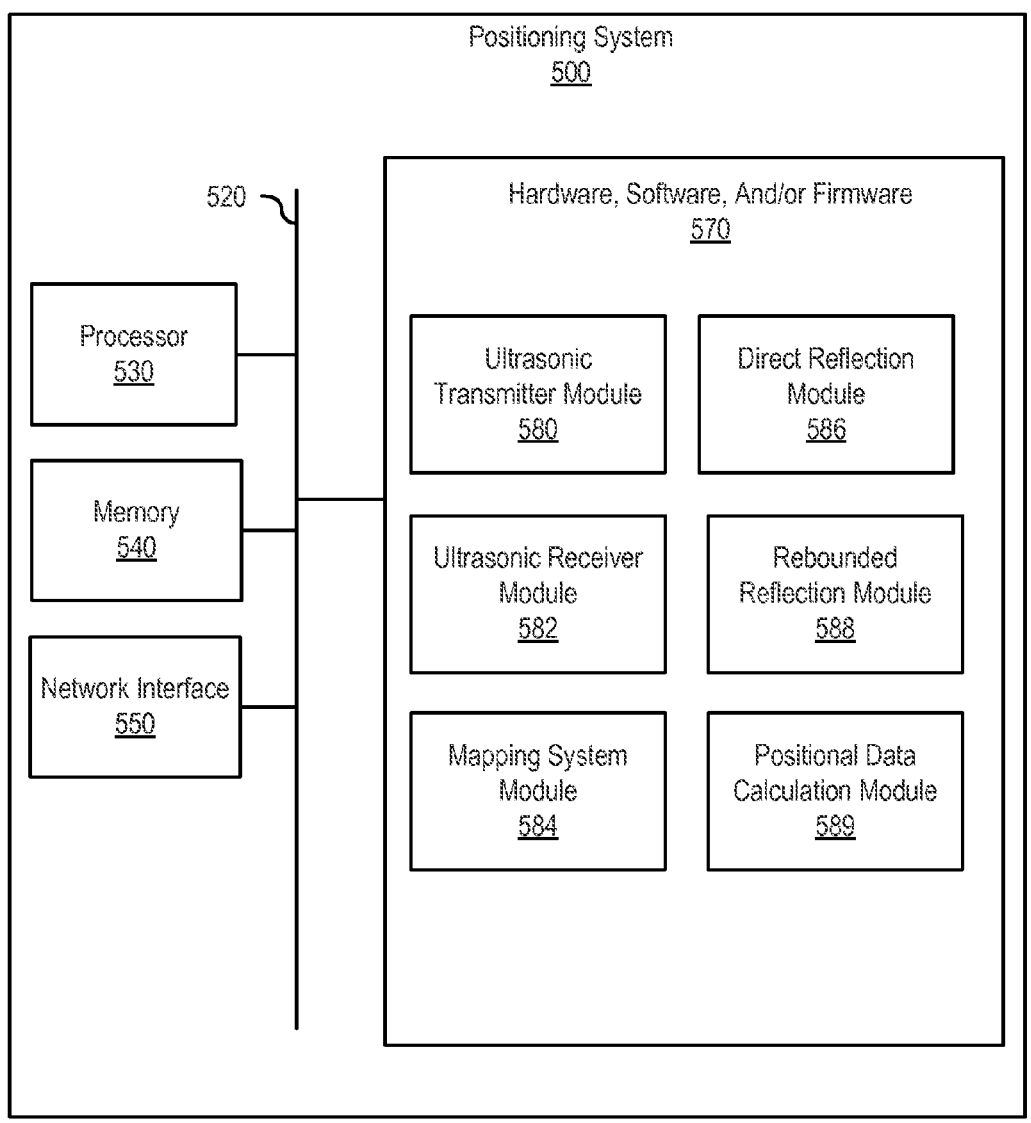
FIG. 5 illustrates a block diagram of a positioning system, according to one embodiment.

FIG. 5 illustrates a block diagram of a positioning system 500, according to one embodiment. As illustrated, a positioning system 500 may include a processor 530, a memory 540, and possibly a network 550 or other data transfer interface. A bus 520 may interconnect various integrated and/or discrete components. Various modules may be implemented in hardware, software, firmware, and/or a combination thereof.

An ultrasonic transmitter module 580 may be configured to transmit ultrasound in any of the various forms and/or methods described herein. An ultrasonic receiver module 582 may be configured to receive a direct ultrasonic reflection from an object within a region. Additionally, the ultrasonic receiver module 582 may be configured to receive rebounded ultrasonic reflection from the object. As used herein, direct reflections and rebounded reflections refer to the various descriptions provided herein as well as the generally understood and variations of these terms.

A mapping system module 584 generates direct positional data associated with the object based on one or more direct ultrasonic reflections. The mapping system module 584 may also generate direct positional data associated with the object based on one or more indirect ultrasonic reflections, as may be understood in the art. The mapping system module 584 may also generate rebounded positional data associated with the object based on one or more indirect ultrasonic reflections, as may be understood in the art.

A direct reflection module 586 may be configured to facilitate, manage, and/or monitor the transmission and/or reception of direct reflections. The rebounded reflection module 588 may be configured to facilitate, manage, and/or monitor the transmission and/or reception of rebounded reflections.

The positional data calculation module 589 may generate direct positional data associated with the object based on one or more direct ultrasonic reflections. The positional data calculation module 589 may also generate rebounded positional data associated with the object based on one or more rebounded ultrasonic reflections. The positional data calculation module 589 may also generate enhanced positional data by combining the direct positional data and the rebounded positional data.

Figure 6:
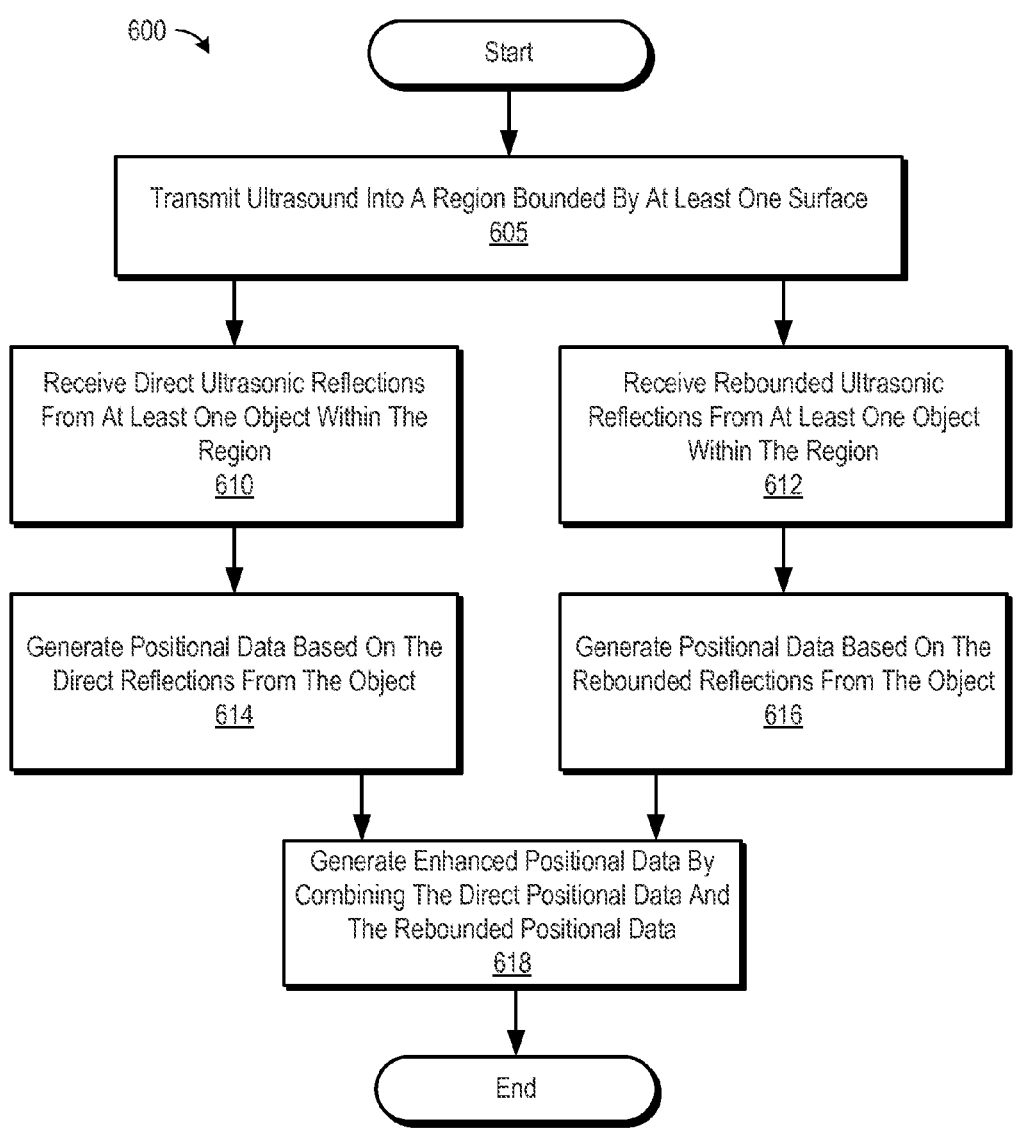
FIG. 6 illustrates a flow chart of a method for generating positional data describing a relative position of one or more objects within a region.

FIG. 6 illustrates a flow chart of method 600 for generating positional data describing a relative position and/or movement of one or more objects within a region. The method steps are provided in no particular order and may be rearranged as would be technically feasible. A positioning system may transmit 605 ultrasound into a region bounded by at least one surface. The positioning system may receive 610 direct ultrasonic reflections from at least one object within the region.

The positioning system may receive 612 rebounded ultrasonic reflections from at least one object within the region. The rebounded ultrasonic reflections may reflect off the wall(s) first and/or off the object(s) first. The positioning system may generate 614 positional data based on the direct reflections from the object. The positioning system may generate 616 positional data based on the rebounded reflections from the object.

The positioning system may generate 618 enhanced positional data by combining the direct positional data and the rebounded positional data. In other embodiments, the positioning system may transmit the direct positional data and the rebounded positional data to another electronic or other processing device for usage.

Any of the various configurations of ultrasonic transmitters, receivers, reflectors, and/or other components described in conjunction with the detection of the position of an object may also be applied to the embodiments described herein with respect to the detection and/or calculation of velocity and/or acceleration data associated with an object or objects, including those embodiments described below with reference to FIGS. 7A-12. For example, direct and rebounded reflections, multiple reflectors and/or ultrasonic paths may be used to calculate velocity and/or acceleration data associated with an object within a region.

FIG. 7A illustrates an ultrasonic system 710 transmitting 720 and receiving 740 reflected ultrasound from a stationary object 730. The spacing between the arcs representing the ultrasound 720 and 740 is representative of the wavelength and/or frequency of the ultrasound. With the object 730 in a stationary position, the reflected ultrasound 740 is not shifted with respect to the transmitted ultrasound 720.

Figure 7B:
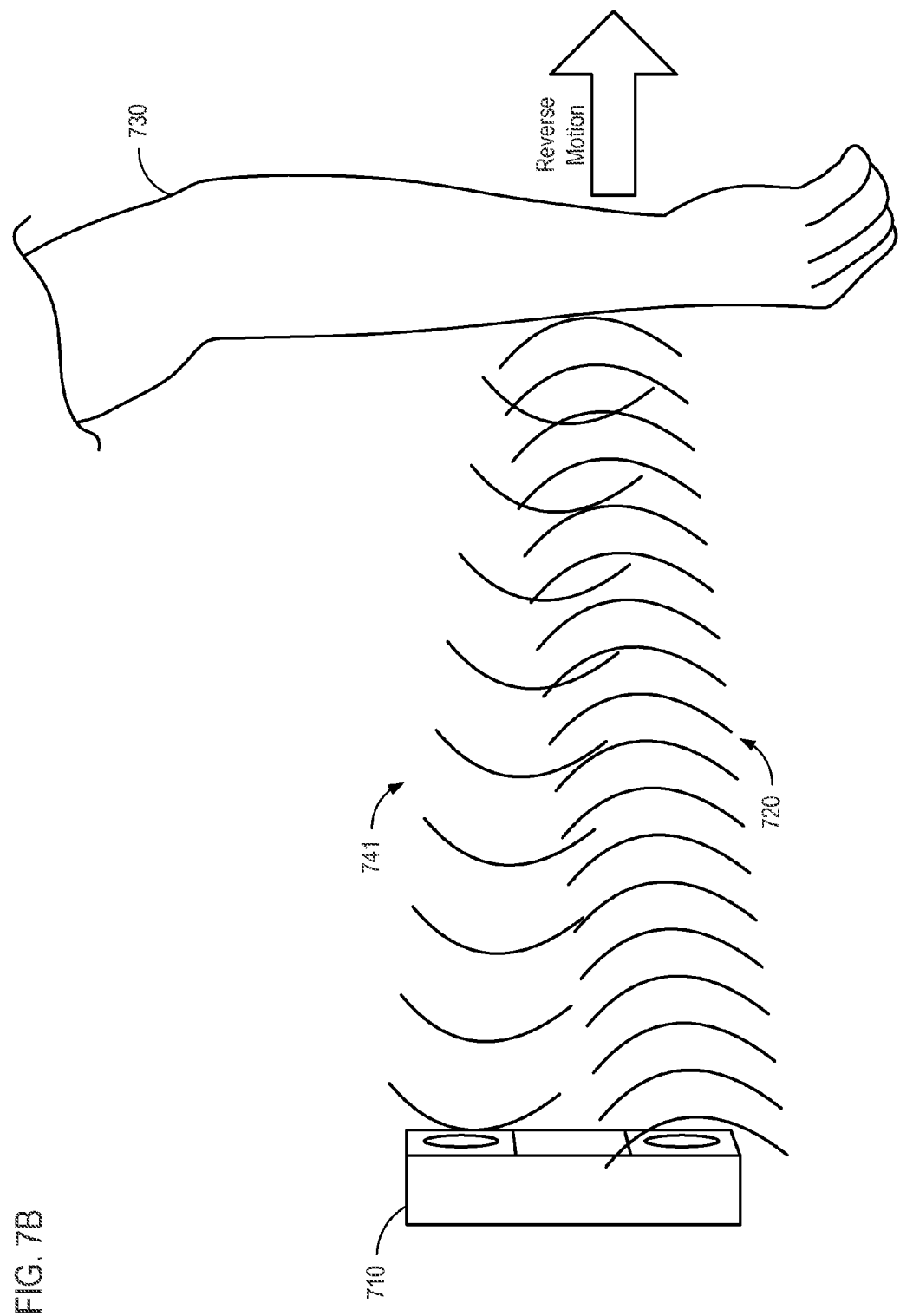
FIG. 7B illustrates an ultrasonic system transmitting ultrasound at a first frequency and receiving reflected ultrasound at a second frequency from an object moving away from the ultrasound system.

FIG. 7B illustrates the ultrasonic system 710 transmitting ultrasound 720 at a first frequency and receiving reflected ultrasound 741 at a second frequency from an object moving away from the ultrasound system 710. The frequency shift can be detected and used to determine the velocity of the reverse motion of the object 730. The frequency shift may be composed of two shifts, one due to the arrival of the ultrasound at the moving object, and the second due to the departure of the reflected ultrasound from the moving object. In the embodiment illustrated in FIG. 7B, both shifts are essentially the same. For example, the velocity of the object 730, $V_o$, is equal to half the change in frequency, $\Delta f$, multiplied by the velocity of the ultrasound, $V_{us}$, divided by the frequency of the transmitted ultrasound, $f_{trans}$, relative to the ultrasonic receiver. Any of a wide variety Doppler shift velocity and/or acceleration calculation and/or estimation algorithms may be utilized.

FIG. 7C illustrates an ultrasound system 710 transmitting ultrasound 720 at a first frequency and receiving reflected ultrasound 742 at a second frequency from an object 730 moving toward the ultrasound system 710. Again, any of a wide variety of Doppler shift algorithms for calculating, determining, and/or estimating the relative velocity of the object 730 with respect to the ultrasonic system 710 may be used. For example, the Doppler equation:

$$f_r = \left(\frac{C - V_o}{C + V_o}\right) f_t \qquad \text{Equation 1}$$

In equation 1 above it is assumed that a transmission medium (e.g., air) is relatively stationary, as are the transmitter and receiver, $f_r$ is the frequency of the received ultrasound, C is the velocity of the ultrasound in the medium (e.g., air), $V_o$ is the velocity of the object relative to the medium (and away from the transmitter and/or receiver), and $f_t$ is the frequency of the transmitted ultrasound. An acceleration of the object may be determined using velocity calculations at multiple discrete time periods and/or by detecting a change in in the frequency of the received ultrasound, $f_r$, over time.

As described herein, the ultrasonic system 710 may include one or more ultrasonic transmitters and/or ultrasonic receivers and the transmitters and receivers may be physically joined (as illustrated in FIG. 7C) or they may be separated and even possible positioned in disparate locations within the region. In some embodiments, the transmitters and receivers may be embodied in a single transducer. In other embodiments, each transducer may act as both an ultrasound transmitter and an ultrasound receiver.

Figure 7D:
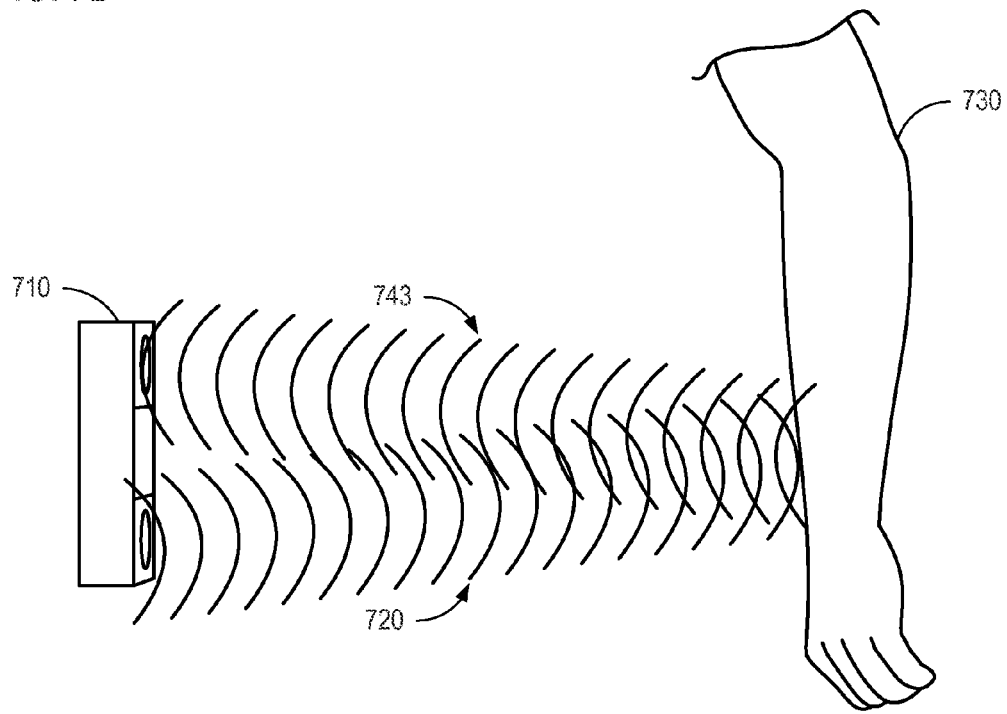
FIG. 7D illustrates an ultrasonic system transmitting and receiving reflected ultrasound from a stationary object, similar to FIG. 7A.

FIG. 7D illustrates an ultrasonic system 710 transmitting and receiving reflected ultrasound 720 and 743 from a stationary object 730, similar to FIG. 7A. FIG. 7D provides a representative context for FIG. 7E.

Figure 7E:
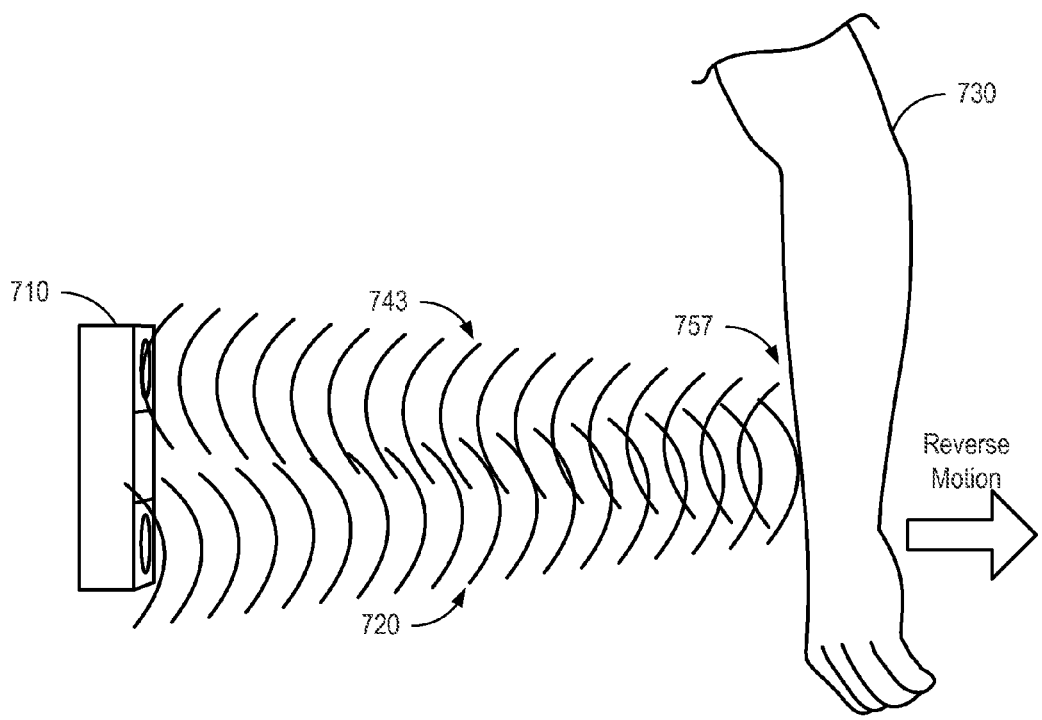
FIG. 7E illustrates a timing delay in a reflected ultrasound from the object as it moves away from the ultrasound system.

FIG. 7E illustrates a timing delay and/or phase shift, illustrated as missing wave arc 757, in reflected ultrasound 743 from the object 730 as it moves away from the ultrasound system 710. As provided herein Doppler shifts may be used to determine acceleration and/or velocity information associated with a moving object. It is, however, recognized the various methods of velocity measurement may be utilized. Including, for example, phase shift (i.e., when received signals arrive) measurements, similar to those used in Doppler echocardiography. It is appreciated that various 1D, 2D, and 3D vector Doppler calculations of velocity and/or acceleration information of an object may be incorporated into the presently described systems and methods, including, but not limited to, 2D Doppler Imaging, Vector Doppler, Speckle Tracking, and others.

Figure 8:
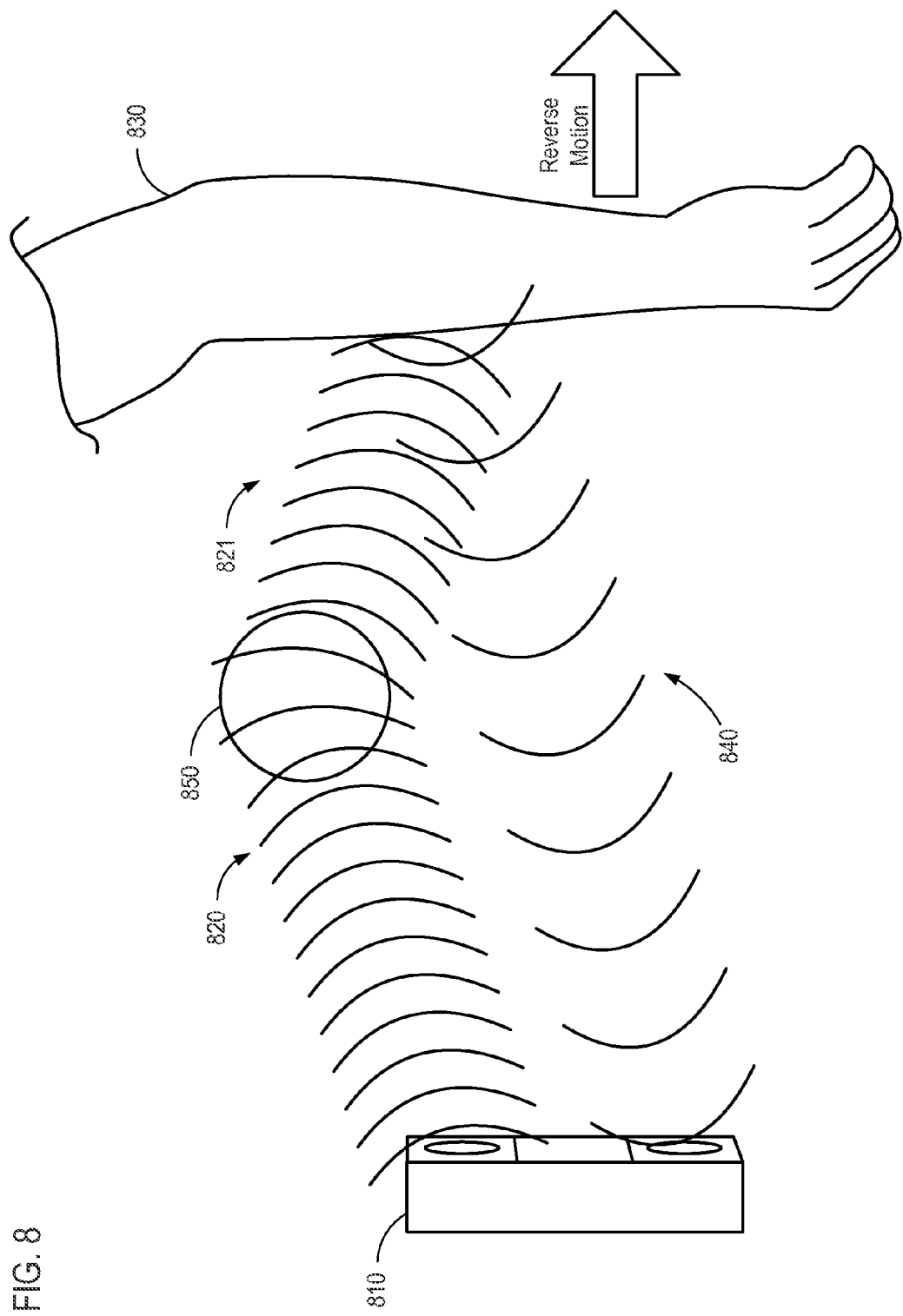
FIG. 8 illustrates ultrasound rebounded off of a reflector prior to being reflected by an object moving away from an ultrasound receiver.

FIG. 8 illustrates ultrasound 820 rebounded, at 821, off of a reflector 850 (e.g., an auxiliary reflector) prior to being reflected by an object 830 moving away from an ultrasound receiver 810. A shift in the received ultrasound 840 relative to the transmitted ultrasound 820 is due to two aspects of the object's velocity, that relative to the arriving ultrasound from the auxiliary reflector as well as that relative to the reflected ultrasound heading back to the receiver 810. The net shift can be used to determine the a velocity component of the object 810 along the vector difference of the reflected and incident ultrasound directions; for specular reflection this component is normal to the object's surface.

In one embodiment, the ultrasound may first be reflected by the object 830, and then rebounded by the reflector 850. In such an embodiment, it may be possible to determine velocity and/or acceleration information of the object 830 relative to the reflector 850.

Figure 9:
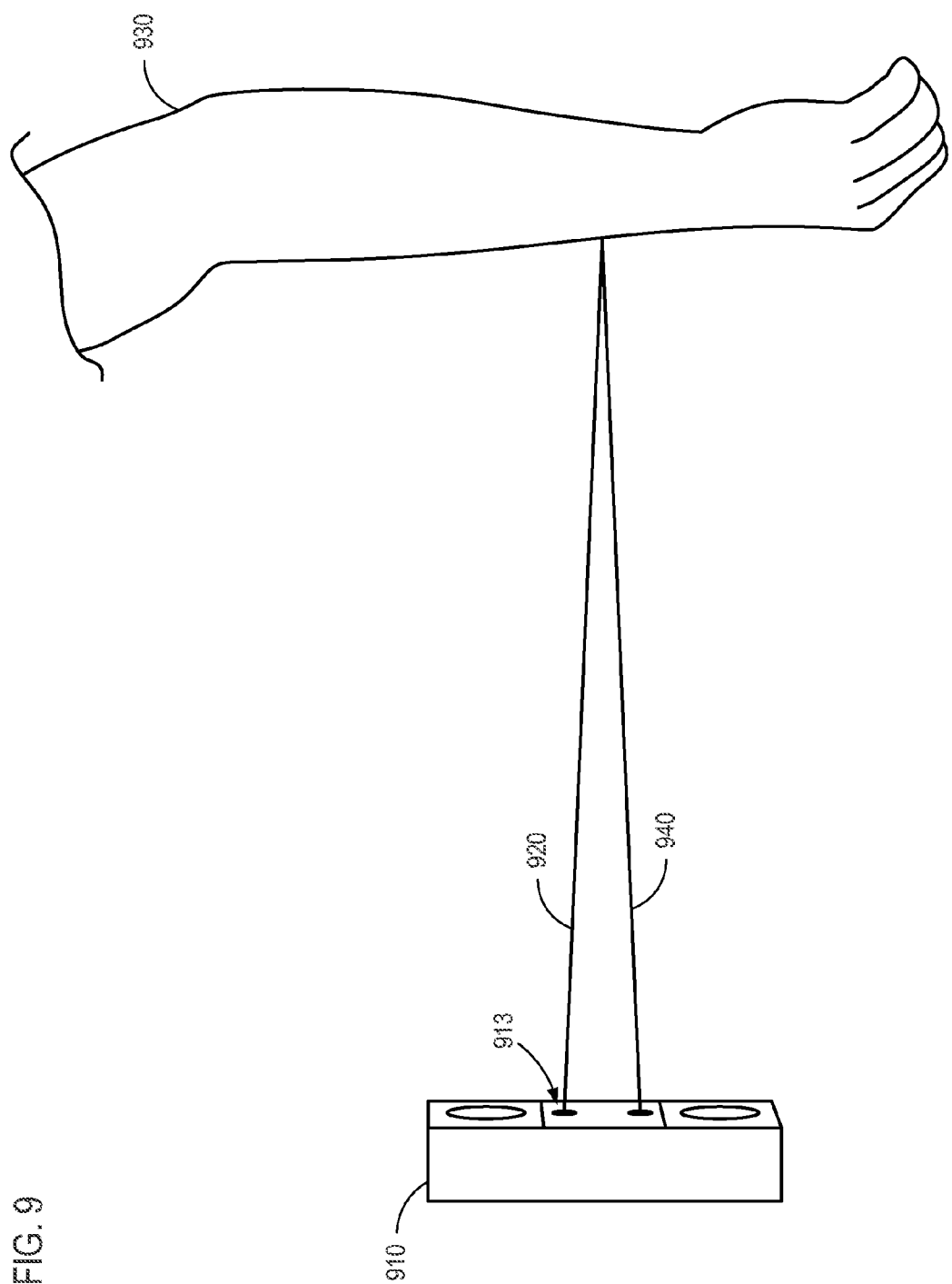
FIG. 9. Illustrates an electromagnetic position detection system used in conjunction with an ultrasound velocity and/or acceleration detection system.

FIG. 9 Illustrates an electromagnetic position detection system 913 used in conjunction with an ultrasound velocity and/or acceleration detection system 910. The ultrasonic velocity and/or acceleration detection system 910 may operate and/or be configured in conjunction with any of the various embodiments described herein for determining position, velocity, and/or acceleration information at a current time and/or for estimating such information at a future time. The electromagnetic position detection system 913 may detect a three-dimensional position of the object 930 using stereoscopic imaging. The electromagnetic position detection system 913 may detect a 3-D position of the object 930 using an imager for two-dimensional direction and time-of-flight for range. For example, a laser or other electromagnetic radiation source may be used to measure a time-of-flight between the system 913 and the object 930. The electromagnetic position detection system 913 may use ambient electromagnetic radiation or may use an artificial source (e.g., an LED, a laser, a radar transmitter) of electromagnetic radiation. The electromagnetic position detection system 913 may use electromagnetic radiation of microwave, terahertz, infrared, visible, or ultraviolet frequencies. The position information obtained via an electromagnetic system 913 may be used in conjunction with velocity and/or acceleration data obtained using the ultrasonic system 910 described herein.

Figure 10:
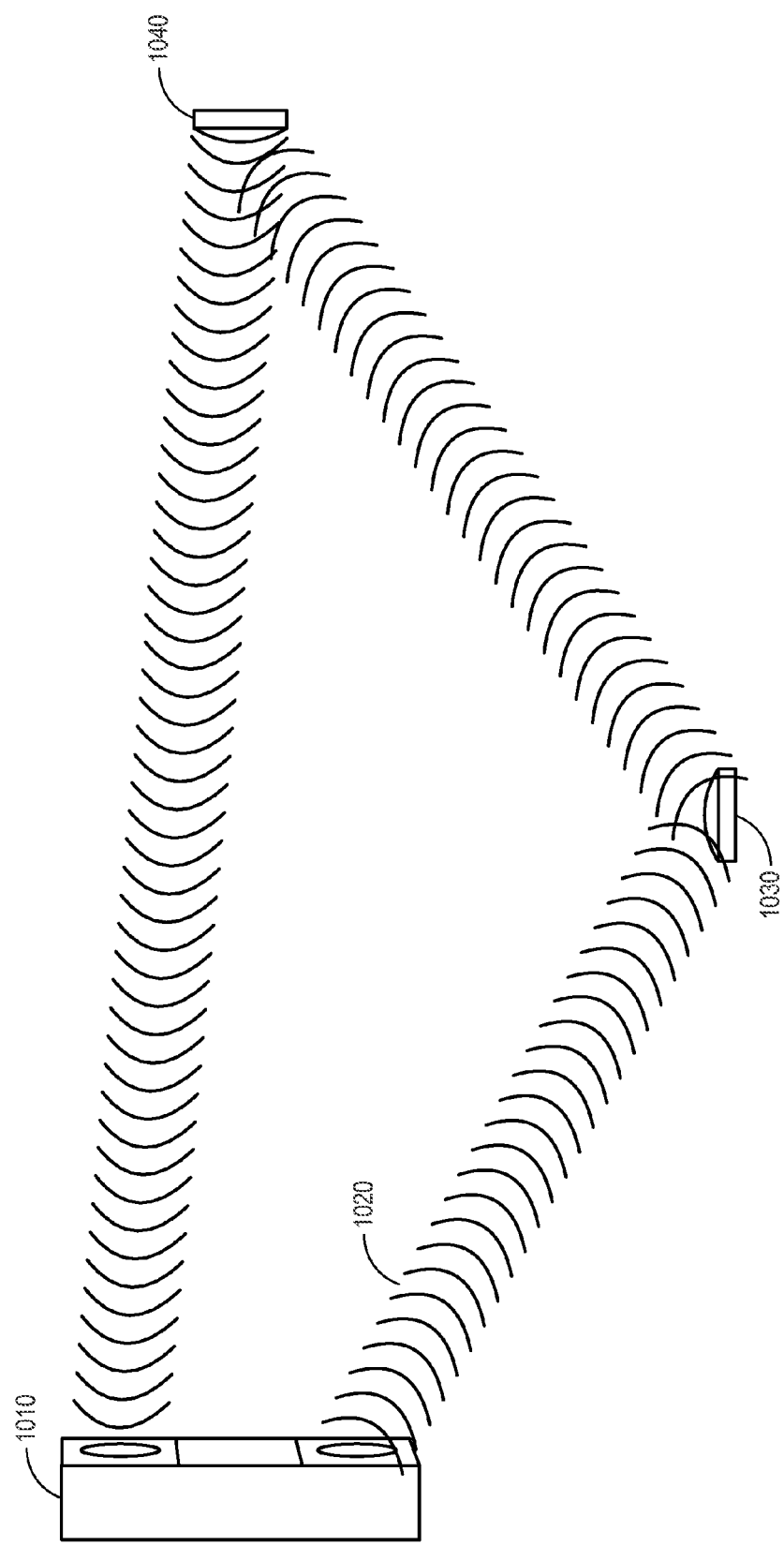
FIG. 10 illustrates ultrasound reflected and/or rebounded from one or more auxiliary reflectors.

FIG. 10 illustrates ultrasound 1020 reflected and/or rebounded from one or more auxiliary reflectors 1030 and 1040. As described in various embodiments, an ultrasound receiver/transmitter 1010 may utilize direct reflections from an object within a region to determine velocity and/or acceleration information based on a detected frequency shift and/or phase shift. In some embodiments, rebounded ultrasonic reflections may be utilized in addition to or instead of direct ultrasonic reflections. Ultrasound reflectors 1030 and 1040 may be active or passive and may be integrated into one or more appliances, walls, or other features of the region. In some embodiments, existing walls, room features, furniture, people, objects, or the like may be identified and/or specified as reflectors 1030 and 1040.

Figure 11:
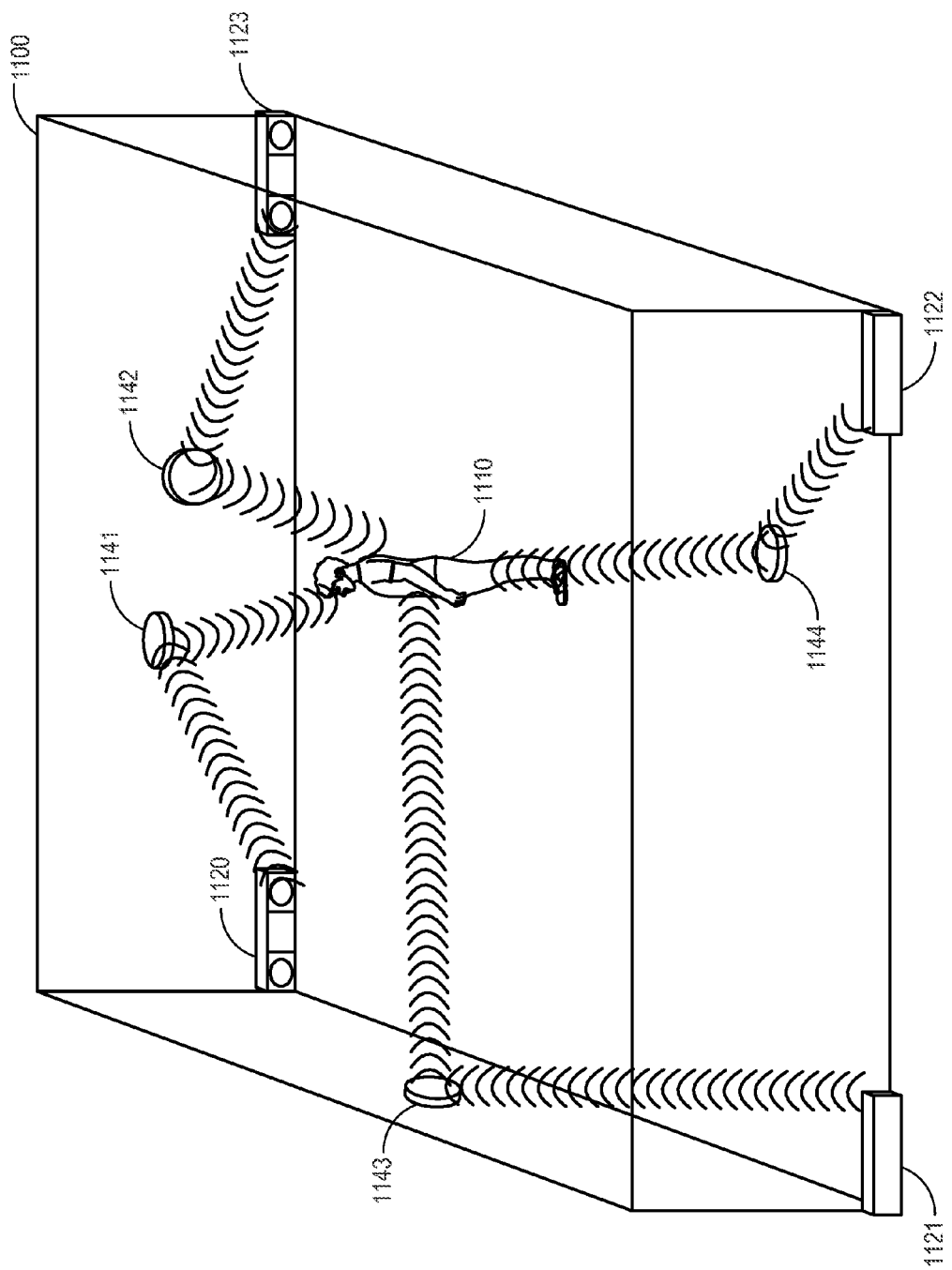
FIG. 11 illustrates a plurality of ultrasonic systems for determining velocity and/or acceleration information from multiple directions.

FIG. 11 illustrates a plurality of ultrasonic systems 1120, 1121, 1122, and 1123 for determining velocity and/or acceleration information from multiple directions relative to the object 1110 or a site on object 1110 within a region 1100. In various embodiments, each ultrasonic system 1120-1123 may include one or more ultrasonic transmitters and one or more ultrasonic receivers. In other embodiments, one or more of the ultrasonic systems 1120-1123 may include one or more ultrasonic transmitters or one or more ultrasonic receivers. In some embodiments, the ultrasonic transmitters and ultrasonic receivers may be separate components spaced apart from one another. As illustrated, the ultrasound may be rebounded off of one or more auxiliary reflectors 141, 142, 143, and 144.

Figure 12:
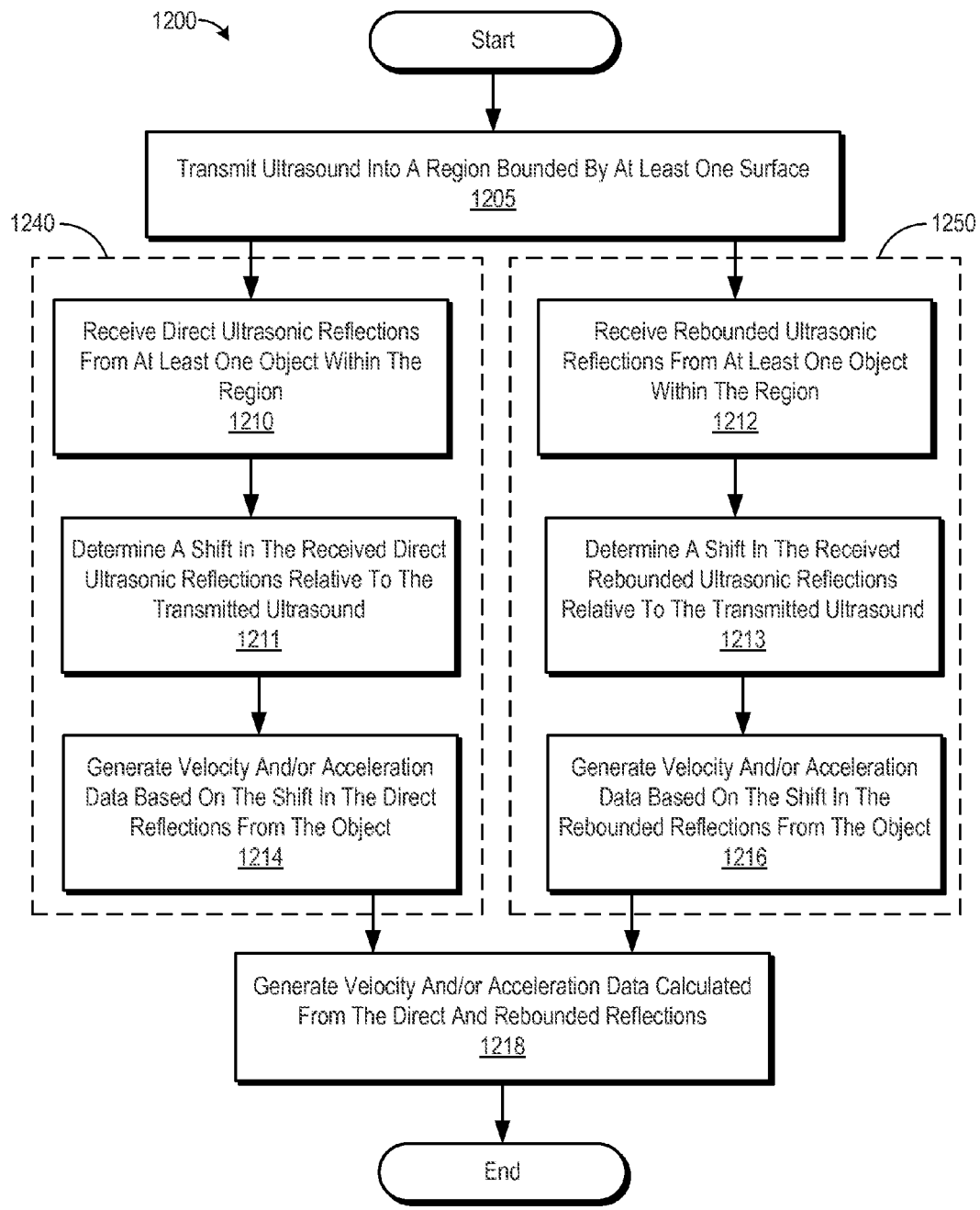
FIG. 12 illustrates a method for determining velocity and/or acceleration information associated with a moving object.

FIG. 12 illustrates a method 1200 for determining velocity and/or acceleration information associated with a moving object. Ultrasound may be transmitted 1205 into a region bounded by at least one surface. Some embodiments may utilize direct reflections from the object to determine velocity and/or acceleration data based on a detected shift in the ultrasound, as provided in block 1240. A receiver may receive 1210 direct ultrasound reflections from at least one object or a site on an object within the region. A shift, such as a wavelength shift, frequency shift, or phase shift, may be determined 1211 between the transmitted ultrasound and the received ultrasound. The system may then generate 1214 velocity and/or acceleration data based on the detected shift.

It is understood that "determining a shift," "detecting a shift," "calculating a shift," and the like may not necessarily require an actual determination of the difference between the, e.g., frequency, of the transmitted and received ultrasound. That is, "detecting a shift" and similar phrases may be constructively performed during a Doppler calculation of velocity and/or acceleration. For example, "detecting a shift" may be constructively performed if a velocity of an object is determined using (1) a known/measured frequency of transmitted ultrasound and (2) a known/measured frequency of ultrasound reflected by the object. The system may or may not actually calculate the frequency difference between the transmitted and received ultrasound, as various derivative and equal algorithms for Doppler-based velocity calculations may be utilized.

In some embodiments, rebounded reflections from the object may be used to determine velocity and/or acceleration data based on a detected shift in the ultrasound, as provided in block 1250. Ultrasound may be transmitted 1205 into a region bounded by at least one surface. A receiver may receive 1212 rebounded ultrasound reflections from at least one object or a site on an object within the region. A shift, such as a wavelength shift, frequency shift, or phase shift, may be determined 1213 between the transmitted ultrasound and the received ultrasound. The system may then generate 1216 velocity and/or acceleration data based on the detected shift. In various embodiments, velocity and/or acceleration data from direct reflections and rebounded reflections may be optionally combined 1218. Velocity and/or acceleration data from direct reflections and rebounded reflections may be used to determine two-dimensional vectors of velocity and/or acceleration information related to the object or a site on the object.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A system for determining velocity data of an object within a region, comprising:
    a position module configured to determine a relative position of an object within a region;
    an ultrasonic transmitter configured to transmit ultrasound into the region;
    an ultrasonic receiver configured to receive an ultrasonic reflection of the transmitted ultrasound from a site on the object within the region;

a shift module configured to detect a shift of the ultrasonic reflection received by the ultrasonic receiver relative to the transmitted ultrasound;

a velocity calculation module configured to calculate a first velocity component associated with the site based on the detected shift of the received ultrasonic reflection;

a modification module configured to modify the state of an entertainment device based on the relative position of the object and the first velocity component of the site;

wherein the ultrasonic receiver is further configured to:
receive a direct ultrasonic reflection from an object within the region, and
receive a rebounded ultrasonic reflection from the object, wherein the rebounded ultrasonic reflection comprises ultrasound reflected by the object and the first surface, and then received by the ultrasonic receiver; and a mapping system configured to:
generate direct positional data associated with the object based on the direct ultrasonic reflection,
generate rebounded positional data using the rebounded ultrasonic reflection of the object from the first surface, and
generate enhanced positional data by combining the direct positional data and the rebounded positional data.

2. The system of claim 1, wherein a signal from the entertainment device is used to identify the site on the object at which to calculate the first velocity component.

3. The system of claim 1, wherein a signal from the entertainment device is used to identify a time at which to calculate the first velocity component.

4. The system of claim 1, wherein a signal from the entertainment device is used to identify a direction in which to calculate the first velocity component.

5. The system of claim 1, wherein the position module is configured to transmit and receive electromagnetic radiation in order to determine a relative position of an object within a region using electromagnetic reflections.

6. The system of claim 1, wherein the position module is configured to receive positional data from an external source.

7. The system of claim 1, wherein the first velocity component associated with the site comprises a velocity component along a vector formed by the difference between the vector direction of the transmitted ultrasound arriving at the site and the vector direction of the reflected ultrasound departing from the site.

8. The system of claim 1, wherein the shift module is configured to calculate a frequency shift of the received ultrasonic reflection relative to a frequency of the transmitted ultrasound.

9. The system of claim 1, wherein the shift module is configured to calculate one of a time delay and a phase shift of the received ultrasonic reflection relative to a timing or phase of the transmitted ultrasound.

10. The system of claim 1, wherein the shift module is configured to calculate a wavelength shift of the received ultrasonic reflection relative to a wavelength of the transmitted ultrasound.

11. The system of claim 1, wherein the state comprises the state of a software program used by the entertainment device.

12. The system of claim 11, wherein the software program comprises an element of a video game.

13. The system of claim 1, wherein the ultrasonic transmitter is configured to:
transmit a first ultrasonic pulse that is received as the direct ultrasonic reflection; and
transmit a second ultrasonic pulse that is received as the rebounded ultrasonic reflection.

* * * * *